US008879426B1

(12) United States Patent
Quilling et al.

(10) Patent No.: US 8,879,426 B1
(45) Date of Patent: Nov. 4, 2014

(54) OPPORTUNISTIC CONNECTIVITY EDGE DETECTION

(75) Inventors: Mark L. Quilling, Sunnyvale, CA (US); Prasanta Bose, Sunnyvale, CA (US); Ken Payne, Littleton, CO (US); Andrew Zimdars, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 1098 days.

(21) Appl. No.: 12/876,045

(22) Filed: Sep. 3, 2010

Related U.S. Application Data

(60) Provisional application No. 61/239,755, filed on Sep. 3, 2009.

(51) Int. Cl.
*H04L 12/28* (2006.01)

(52) U.S. Cl.
USPC ........... 370/255; 370/245; 370/256; 700/250; 700/252

(58) Field of Classification Search
CPC ........................................ F41H 7/005
USPC .......... 370/245, 255, 256; 700/250, 251, 252, 700/253
See application file for complete search history.

(56) References Cited

U.S. PATENT DOCUMENTS

| 5,001,635 | A  | * | 3/1991  | Yasutomi et al. ................ 701/26 |
| 6,408,226 | B1 | * | 6/2002  | Byrne et al. .................... 700/258 |
| 6,809,490 | B2 | * | 10/2004 | Jones et al. .............. 318/568.12 |
| 6,841,963 | B2 | * | 1/2005  | Song et al. .............. 318/568.12 |
| 7,162,338 | B2 | * | 1/2007  | Goncalves et al. ............. 701/23 |
| 7,200,130 | B2 | * | 4/2007  | Forstadius et al. ............ 370/338 |
| 7,456,596 | B2 | * | 11/2008 | Goodall et al. .......... 318/568.12 |
| 8,010,900 | B2 | * | 8/2011  | Hart et al. ...................... 715/747 |
| 8,072,947 | B2 | * | 12/2011 | Cho et al. ...................... 370/338 |
| 8,095,238 | B2 | * | 1/2012  | Jones et al. .................... 700/245 |
| 8,159,945 | B2 | * | 4/2012  | Muro et al. .................... 370/232 |
| 8,180,486 | B2 | * | 5/2012  | Saito et al. .................... 700/245 |
| 8,271,132 | B2 | * | 9/2012  | Nielsen et al. ................ 700/250 |
| 8,374,721 | B2 | * | 2/2013  | Halloran et al. ............. 700/245 |
| 8,396,597 | B2 | * | 3/2013  | Anderson ..................... 700/259 |
| 8,457,829 | B2 | * | 6/2013  | Huang et al. .................... 701/25 |
| 8,536,988 | B2 | * | 9/2013  | Ritter ........................ 340/286.02 |
| 8,547,910 | B2 | * | 10/2013 | Chakrabarti et al. ......... 370/329 |
| 2004/0167670 | A1 | * | 8/2004  | Goncalves et al. ........... 700/259 |
| 2004/0220707 | A1 | * | 11/2004 | Pallister ......................... 701/24 |
| 2005/0222713 | A1 | * | 10/2005 | Kawabe et al. ............... 700/259 |
| 2006/0010638 | A1 | * | 1/2006  | Shimizu et al. ................. 15/319 |
| 2006/0153154 | A1 | * | 7/2006  | Yoon et al. .................... 370/338 |
| 2006/0253570 | A1 | * | 11/2006 | Biswas et al. ................. 709/224 |
| 2006/0262753 | A1 | * | 11/2006 | Cho et al. ...................... 370/331 |
| 2006/0293810 | A1 | * | 12/2006 | Nakamoto ....................... 701/28 |
| 2007/0010248 | A1 | * | 1/2007  | Dravida et al. ............ 455/435.1 |
| 2007/0195870 | A1 | * | 8/2007  | Lewis ........................... 375/219 |

(Continued)

*Primary Examiner* — Andrew Lai
*Assistant Examiner* — Andrew C Lee
(74) *Attorney, Agent, or Firm* — McDermott Will & Emery LLP

(57) ABSTRACT

A distributed coordination and control protocol may enable a set of mobile, self-organizing, robotic relay nodes to adaptively seek positions in such an environment that establishes a network, meeting desired coverage in terms of connected warfighters. Distributed coordination of robotic relay nodes may allow the network to dynamically adapt as positions of warfighters change and/or the network demands change. An algorithm is provided that may be scalable to a large number of robots and may be robust to random deployment of robots, robot platform failures, channel dynamics, and changing warfighter positions.

62 Claims, 11 Drawing Sheets

(56) References Cited

U.S. PATENT DOCUMENTS

2008/0268855 A1* 10/2008 Hanuni et al. ............... 455/445
2009/0213760 A1* 8/2009 Shin et al. .................... 370/254
2010/0067427 A1* 3/2010 Choudhury ................... 370/315

* cited by examiner

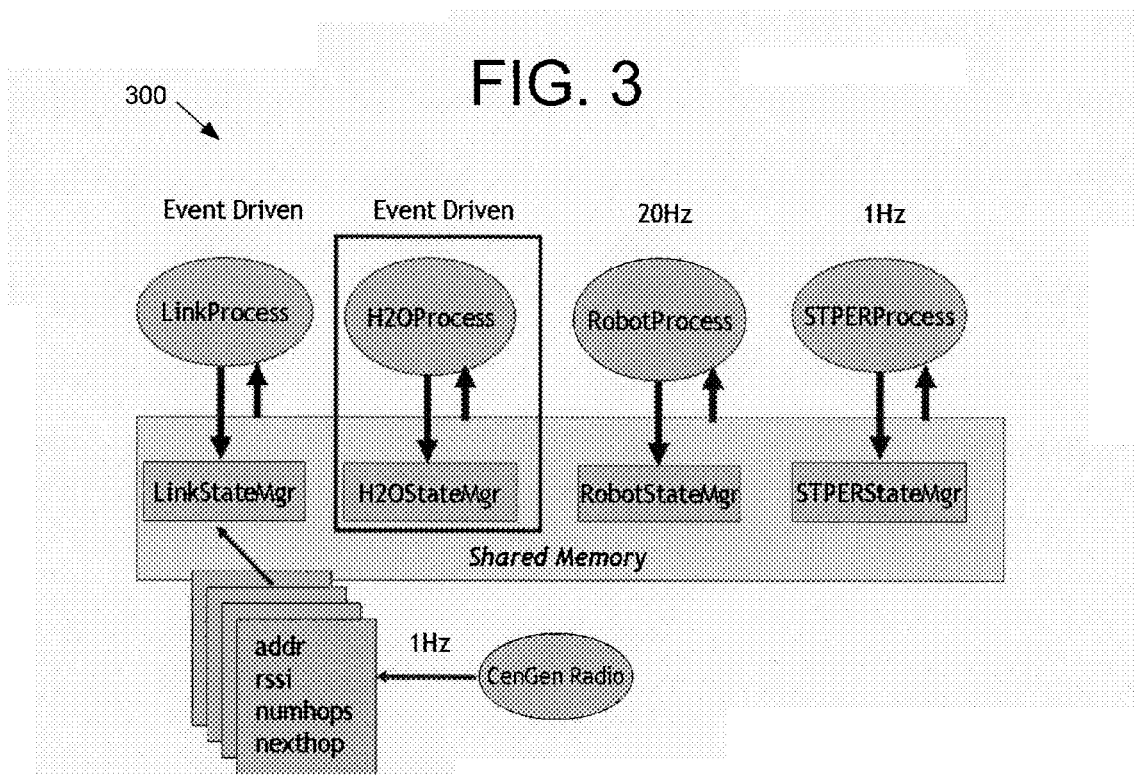
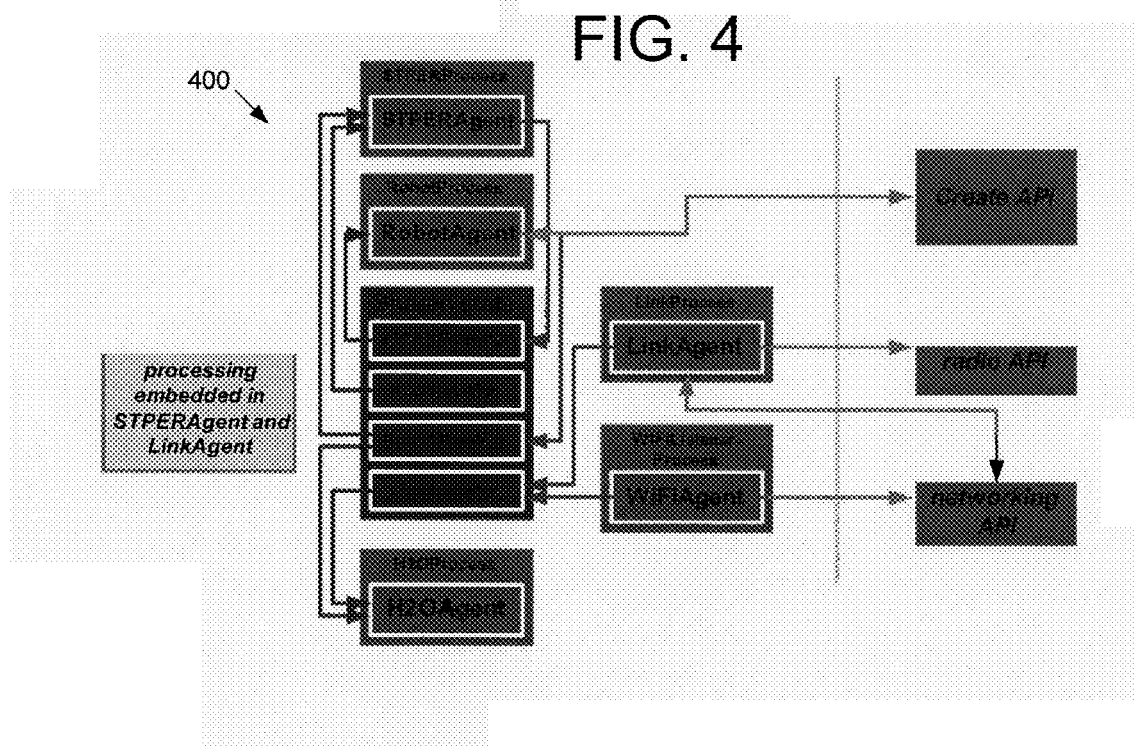

OPPORTUNISTIC CONNECTIVITY EDGE DETECTION

RELATED APPLICATION

This application claims priority to U.S. Provisional Patent Application No. 61/239,755 filed Sep. 3, 2009 and entitled "Opportunistic Connectivity Edge Detection," the entire content of which is incorporated herein by reference.

STATEMENT REGARDING FEDERALLY SPONSORED RESEARCH OR DEVELOPMENT

The invention was made with Government support under Contract No. 700K8K111000 awarded by the Defense Advanced Research Projects Agency. The Government has certain rights in the invention.

FIELD OF THE INVENTION

The present invention generally relates to communications networks, and more particularly to mesh networks that include autonomous self-configuring nodes that are capable of opportunistic connectivity edge detection.

BACKGROUND

Search-and-Rescue missions and missions requiring access to areas of denied access (such as caves and buildings) create challenges for keeping warfighters connected and for reliable exfiltration of situation-awareness data. Networked communication is hindered by line-of-sight communication and also uncertainty in the position of the warfighters. Static solutions that place relay nodes at fixed locations fail to survive the dynamics of the networking needs (e.g., changing demands and warfighter positions) as well as the uncertainty of the channel conditions (e.g., limited and/or noisy line-of-sight communications). As a result, mobility of warfighters often breaks mission-critical communication links. Statically placed relays nodes may only provide radio coverage to a fixed set of locations. These locations need to be pre-specified and may only be changed by a warfighter—manually moving a relay node.

Current manual approaches to deploying and setting up robust ad-hoc wireless networks in in-door and obstacle-rich environments is labor intensive and furthermore such statically configured networks fail to adapt to the dynamics of the physical and network environment. Current approaches to deal with such situations are human intensive and can require planning, RF measurements, and manual placement of relay nodes. Such approaches may fail in in-accessible environments and in-door hostile environments typical of special operations missions. Other approaches based on robotic navigation via map construction and landmark identification may necessitate use of costly and labor-intensive global positioning systems (GPS), laser range finders, and/or camera devices but may fail to work due to not considering the dynamic RF environment in the map construction process

SUMMARY OF THE INVENTION

According to various aspects of the subject disclosure, a problem of coordinated placement of robots is addressed in a complex in-door environment that meets mission-specific objectives of creating and maintaining a wireless ad-hoc network. Some approaches to deploying and setting up robust ad-hoc wireless networks in in-doors and obstacle rich environments can be labor intensive. Furthermore, such statically configured networks may fail to adapt to the dynamics of the physical and network environment. An algorithm is provided that enable self-configuration of a mesh network and autonomously adapt such connectivity in response to node failures and environment disturbances. In addition, the algorithm may be independent of the environment. For example, it may not matter whether the robots are on the same floor, different floors, or even different buildings because they may coordinate and configure the network regardless of their initial random deployment. The algorithm provides a foundation for which a robust dynamic adaptive mesh network can be formed.

According to various aspects of the subject disclosure, physics of line-of-sight (LOS) communication may be exploited in an indoor environment. Junctions in a building may correspond to corners of hallways (L-junction), hallway crossings (X-junction), hallway terminations (T-junction), or other types of junctions. Although these regions may predominantly lie in previously described junctions, they need not be. The junctions may be defined by characteristics of radio, for example, when the radio goes from having a connection to not having a connection. What this may mean is that these junctions can actually exist in physical locations that cannot be visually sensed and can only be recognized via radio frequency (RF) communication sensing (e.g. behind a hollow wall or a long hallway where signals may drop-off due to jamming or due to attenuation). As a result, an algorithm is provided that is able to find non-trivial placement of relay nodes and construct a network more reliable than any human can construct. For example with a cell phone, there may be some places where the signal is very good and other places where it is very poor. Without cell phone bars indicating the signal strength, humans may not be able to detect the regions. In some aspects, an algorithm is provided that uses a similar concept and is able to find spots which most reliably connect the network.

According to various aspects of the subject disclosure, an algorithm is provided that is based on the idea of connectivity junctions, as described above. Any region, whether it is a building, a cave, a warehouse, or other places, may have a specific set of connectivity junctions for a given set of warfighter locations. As the warfighters move, these junctions may change. By placing robotic relay nodes at these junctions and allowing them to adapt as these junctions change may provide a reliable network in the presence of many uncertainties. In some aspects, the algorithm may be used with any type of motion behavior. For example, the junctions may be found by any means such as by following a wall, doing a bump and run, doing a zigzag, wall climbing, or even flying. In some aspects, the algorithm may perform the same way under any of these motions.

In some aspects, the only input that may be needed is a coordination heartbeat (e.g., sent from neighbors every second) and a signal strength to neighboring nodes. When relay nodes are deployed, they may execute a motion behavior (e.g., wall following). If the relay nodes are directly connected to a base station or warfighter, they may "hold" that connection (e.g., never let the connection degrade to a poor state). Otherwise, the relay nodes may search un-constrained. Nodes that are holding connections may explore until that connection becomes poor. The node may then stop and return to a location where the connection was good and sit there as a stationary node (e.g., the node has found a junction). Now, other relay nodes can tether to this node just as if it was a new access point. Nodes that are deployed without any connection may simply search until they find one, "hold" it, and perform the previously described search. Each warfighter may be treated as a seed, and the robotic relay nodes may "grow" outwards from the warfighters, eventually connecting everything. In some aspects, other behaviors of the nodes may include merging, locally optimizing, redundancy checking, spanning tree, and other behaviors. These behaviors provide a robust algorithm that may deploy the network optimally (e.g., in a minimal relay sense). As warfighters move, the network may continue to try to hold that connection, even if it means the nodes have to move and stretch the network.

According to various aspects of the subject disclosure, an algorithm is provided that may allow a set of robotic relay nodes to be randomly deployed within a building, cave, or other areas, and the robots may seek out and find connectivity junctions that provide radio communication between each asset. This may be done with limited sensor information (e.g., bump sensor, signal strength, and wall sensor, which may all be local on-board) and minimal coordination overhead.

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 3 depicts a diagram of software architecture, in accordance with an exemplary embodiment of the present disclosure.

FIG. 4 depicts a diagram of concurrent processes for mesh network control, in accordance with exemplary embodiments of the present disclosure.

Figure 1:
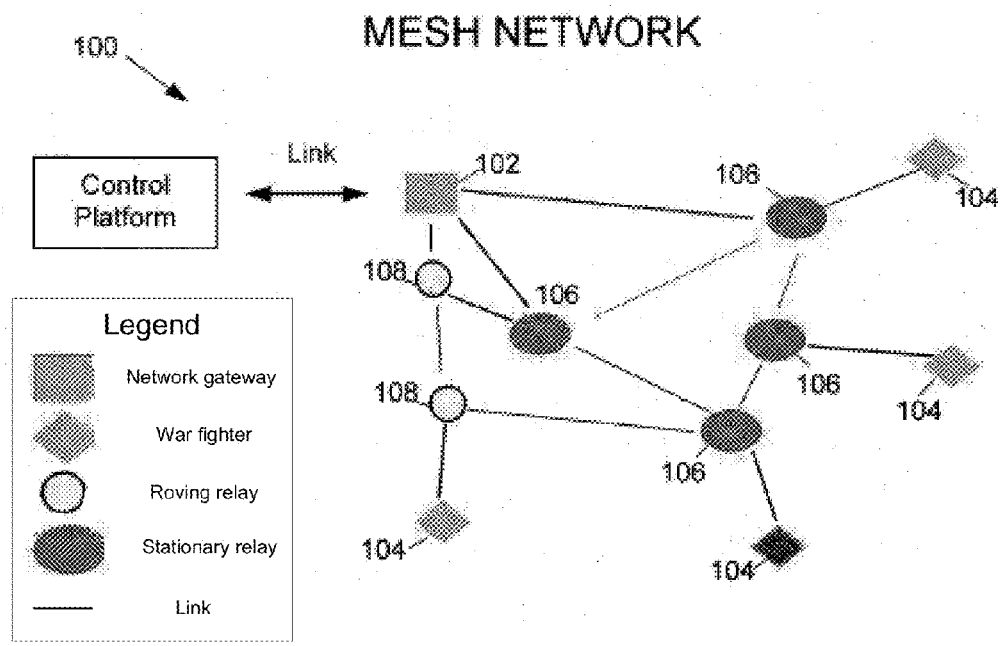
FIG. 1 depicts a diagrammatic view of a mesh network infrastructure deployed over an area, in accordance with exemplary embodiments of the present disclosure.

One skilled in the art will appreciate that the embodiments depicted in the drawings are illustrative and that variations of those shown, as well as other embodiments described herein, may be envisioned and practiced within the scope of the present disclosure.

DETAILED DESCRIPTION OF THE INVENTION

According to various aspects of the subject disclosure, a distributed coordination and control protocol may enable a set of mobile, self-organizing, robotic relay nodes to adaptively seek positions in such an environment that establishes a network, meeting desired coverage in terms of connected warfighters. Distributed coordination of robotic relay nodes may allow the network to dynamically adapt as positions of warfighters change and/or the network demands change. Algorithms are provided that may be scalable to a large number of robots and may be robust to random deployment of robots, robot platform failures, channel dynamics, and changing warfighter positions.

In accordance with various aspects of the subject disclosure, the subject technology is related to robotics, self-organization, adaptation, ad-hoc networks. In various aspects of the subject disclosure, the subject technology may be used in various markets, including for example and without limitation, advanced sensors, advanced software, and information assurance markets. In accordance with various aspects of the subject disclosure, robots can include robots that are deployed terrestrially, e.g., in urban or rural theatres, and/or that are deployed extra-terrestrially, e.g., in orbital satellite or lunar theatres, and the like. In one example, the subject technology can be implemented using an extended iRobot Create robot (made available by the iRobot Corporation having a place of business at 8 Crosby Drive Bedford, Mass. 01730) or networked groups of such or similar robots.

Embodiments of the present disclosure can provide for decentralized multirobot behavior selection and execution. Such behavior selection can result from robots being controlled to arrive at a coordinated role assignment based on noisy local observations. These local observations can lead to robots assigning different priorities to tasks (e.g. self-healing vs. link optimization) or may cause inconsistent assessments of applicability or exit criteria for specific behaviors. In addition, decentralized behavior selection can be based on or influenced by tradeoffs between the richness of data shared among robots and the quality of the decision reached; excessive negotiations will consume the network capacity gained by selecting new behaviors.

Embodiments of the present disclosure can provide for maintenance of a distributed map locating users, nodes and base stations in the physical and RF environment. A low, e.g., $100 price point, for robotic radio relay node hardware can restrict or limit the types of sensors installed on each node, e.g., to bump sensors, an infrared wall sensor and rotary encoders on the drive wheels. Such sensors can be noisy and require a node to infer complex features (like the outline of a room or the position of a doorway) from limited inputs. In addition, robots will start in different positions and orientations, and may find themselves located in disconnected spaces. Information about the wall segments and properties of areas being explored (e.g., hallways or rooms) is useful for navigation. Radio RSSI is a very noisy indicator for distances; however, effective behavior selection (such as being stationary relay or redundant relay nodes) will require the robot network to construct a global map of network connectivity to act cooperatively.

Embodiments of the present disclosure can provide for maximization of network capacity and lifetime while meeting quality of service (QoS) requirements of tactical applications. Effective control of mesh network infrastructures according to the present disclosure can include efficient management of two sets of resources: (i) the sensing and actuation capabilities provided by the robot platform, and (ii) the network degrees of freedom provided by the radio hardware to achieve user capacity and QoS requirements. The robot platform and networking hardware can rely on common power supplies, which can utilize control software to balance movement and transmit power to achieve required connectivity and throughput.

Embodiments of the present disclosure can provide for adaptation to changes in the robots' environment. The robotic nodes can be deployed in urban and rural environments such as cluttered multistory buildings and noisy RF channels. As a result, changes in the locations of test points, the configuration of the environment, and the capabilities of the robots (as batteries deplete and components fail) can require parametric adaptation to fine-tune high-level behaviors to the specific challenges of the moment.

FIG. 1 depicts a diagrammatic view of a mesh network infrastructure 100 deployed over an area, in accordance with exemplary embodiments of the present disclosure. The infrastructure 100 can include a network gateway 102 and a plurality of robotic radio relay nodes. The network gateway 102 can be configured to link with a network robot control platform over a link, as shown. The relay nodes can be controlled to act as stationary relays, e.g., 106, or roving relays, e.g., 108, as shown. The relay nodes can be deployable over an area by one or more war fighters 104, e.g., ground personnel or airships, etc. The relay nodes are configured to for communications links with each other and the gateway 102.

Figure 2:
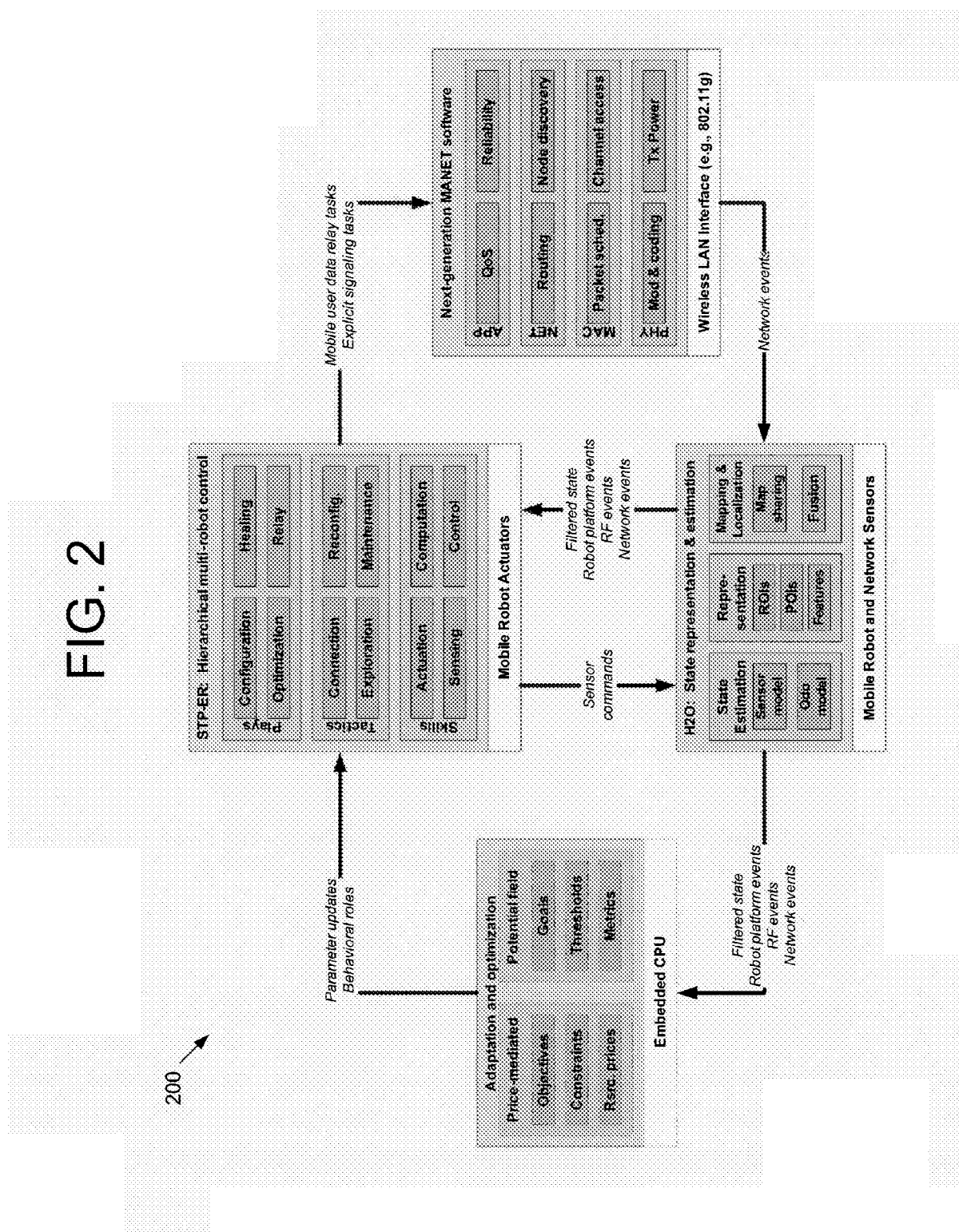
FIG. 2 depicts a block diagram of software architecture 200 including functional software components for controlling operation of a mesh network including smart robotic relay nodes, in accordance with exemplary embodiments of the present disclosure.

FIG. 2 depicts a block diagram of software architecture 200 including functional software components for controlling operation of a mesh network including smart robotic relay nodes, in accordance with exemplary embodiments of the present disclosure. assigns one software component to each of the major capabilities required for effective control of mobile robots as wireless mesh networking routers, and grounds each software component in a subsystem of the robot platform.

The architecture 200 can function to separate major robot control tasks as processes that coordinate through shared data. Edges in this architecture diagram correspond to communication both between nodes and among processes within a node. Adaptation and optimization functionality can be embedded in the other functional blocks.

Embodiments of software according to the present disclosure can implement a hierarchical task selection and motional planning technique known as STP-ER ("skills, tactics and plays for exploration and relay", at north in FIG. 2). Robots jointly select a multi-robot "play" that assigns roles to individual robots according to their internal state and local environment. Individual robots then execute role-specific "tactics", temporally extended behaviors typically specified as state machines, by executing "skills", platform-independent versions of primitive movement, sensing, and communication actions. Exemplary implementations of the software components implementing STP-ER are described in further detail below, e.g., for FIGS. 6-13.

Each instance of STP-ER can depend on a corresponding instance of $H_2O$ ("hierarchical, hypothetic, and opportunistic" localization, map-building and state estimation, at south in FIG. 2) for a map of the robot's RF and physical environment and its relationship to other robots. The tactics executed by each robot include sensing skills that accumulate information about the robots physical environment, such as the locations of obstacles. $H_2O$ combines this sensor data with information about link and network state collected by the government-furnished networking software. Data maintained by exemplary embodiments of $H_2O$ are described below.

Embodiments of control software implementations according to the present disclosure can include the control APIs provided by the government's networking software stack. This interface provides control over transmit power and link data rate, and reports the current routing table and link state (in the form of received signal strength). A software adapter can be implemented that polls the network interface for state changes and shares them with other software components using the mechanisms described below, e.g., for FIGS. 4-5.

Embodiments of the present disclosure can provide efficient use of network resources in the face of incomplete information about the networking environment by providing the ability for nodes to fine-tune tactics and skills by adapting robot and network control parameters. For example, software can embed joint optimization and adaptation capabilities in specific tactics and plays, including the "spoker" self-optimization tactic and the spanning tree computation performed by the initialization play.

In a self-organizing mesh network, the robot platform and networking hardware act on multiple time scales. Radios can transmit individual packets in a millisecond or less, but deal with delivery requirements for flows lasting several seconds or even minutes. Robots can change direction or detect a collision in less than one-tenth second, but may require several minutes to discover the perimeter of a room.

The software controlling this hardware also can act on multiple timescales, as shown in FIG. 3. Multi-robot behaviors may require several minutes to achieve their goal conditions, while an individual robot's controller will respond quickly if its sensors indicate a change of course. The software architecture therefore addresses the core capabilities of the robot control software as a group of four concurrent processes communicating through shared data.

In exemplary embodiments, functional architecture of software for running a self-organizing mesh network maps the major control capabilities to multiple concurrent processes running in embedded Linux. FIG. 4 depicts the mapping from capabilities provided by the conceptual architecture to processes implemented by the functional architecture.

The separation of individual capabilities into multiple processes achieves several goals. In the case of STP-ER, the construction of separate STPERProcess and RobotProcess entities achieves a timescale decomposition that allows role and behavior selection to gradually accumulate information about the environment while fine-grained motion planning responds quickly to sensor readings. In the case of the networking software, the two processes can implement distinct functions: LinkProcess monitors the state of the network, while WiFiListenerProcess transmits messages among robots. H2OProcess is event-driven, with processing triggered by new link data or messages from other processes.

The main channel for information sharing between different components of the Self-organizing mesh system is shared memory. Each agent has a corresponding StateManager class that defines the data made available to other agents (for example, an H2OAgent instance has an associated H2OStateManager instance). These StateManager subclasses are contained within singleton subclasses of StateMgr that serve as a shared database between agents. By enforcing uniqueness of StateMgr instances, the design guarantees that only one process can write to each section of shared memory, greatly simplifying implementation of concurrent processes. In addition, the StateMgr class provides the semaphore protection and management of the suite of StateManagers. The StateMgr class also manages the queues including operations to push and pop. Each process instantiates its own StateManager class specifying the data it will read and write, and the class then creates (for writable data) or connects to (for read-only data) the correct region of memory.

StateManager instances use two methods to access shared data. The refresh( ) method copies shared data to a local copy within the StateManager class, minimizing contention over shared resources and preventing inadvertent overwrites of shared data. The post( ) method copies the local copy to the corresponding shared memory region. Again this minimizes contention for shared resources.

Each agent has a method called run( ) that executes each agent's tasks. This method is called from a process that runs at a predefined rate. Network control functionality can mediate interactions by specifying a different execution rate for each agent. For example, the RobotAgent needs to run at around 20 Hz to sample odometry sensors accurately and detect bumps before the motor stalls. H2OAgent needs to run at least as fast as the RobotAgent in order to process the events it sends, but the STPERAgent runs on a slower time scale (around 1-2 Hz). In comparison to a sequential execution model in which each process runs at the same fixed rate, this approach was found to reduce errors in delay-sensitive sensor data (like odometry readings) and enable the agent to respond faster to events like collisions or messages from other robots.

Figure 5:
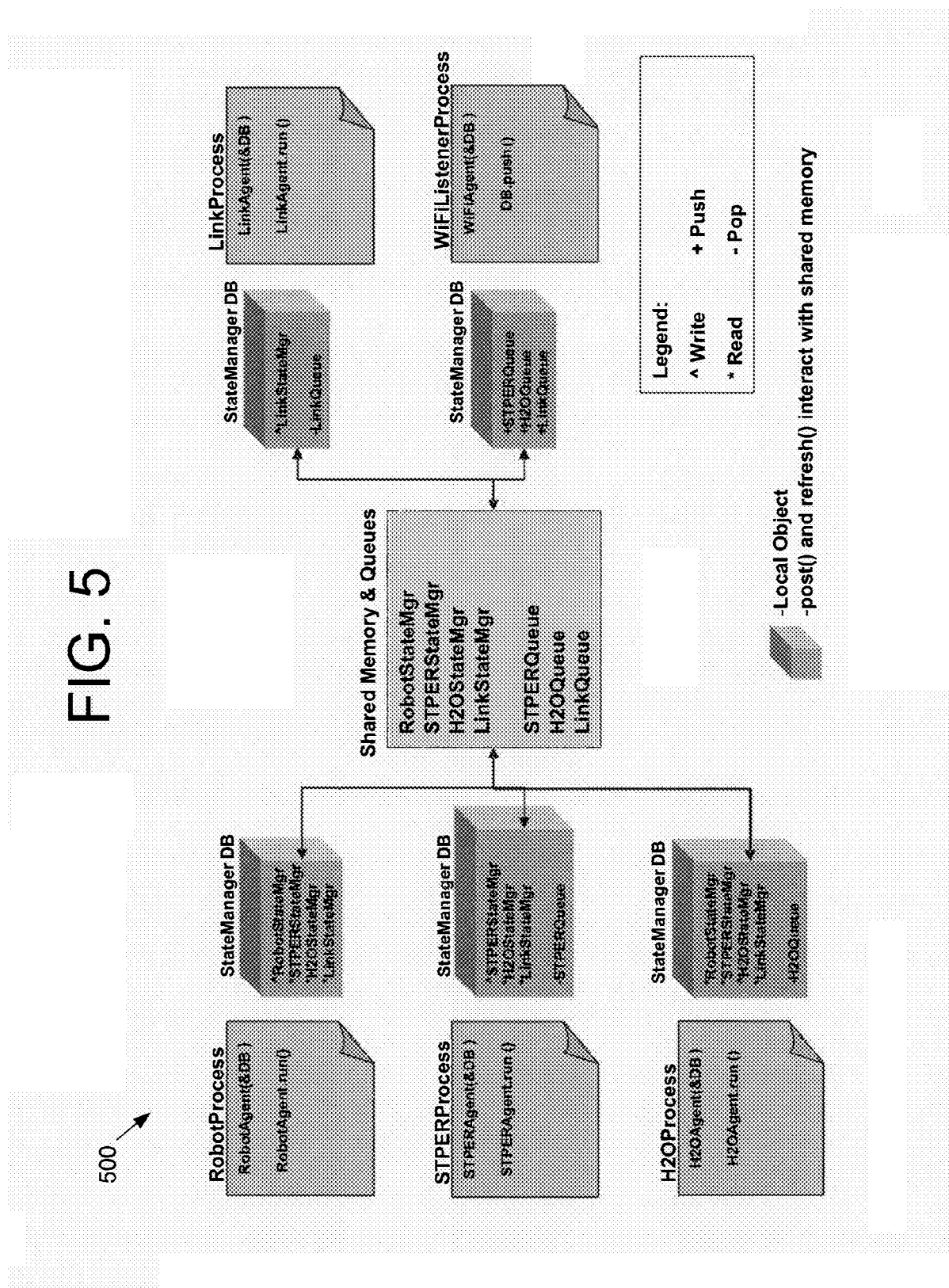
FIG. 5 depicts components of mesh network control software, in accordance with an embodiment of the present disclosure.

FIG. 5 depicts a diagram 500 of the interactions among the five processes that compose an exemplary embodiment of mesh network control software: RobotProcess, H2OProcess, STPERProcess, LinkProcess, and WiFiListenerProcess. Each process hosts an "agent" that performs the associated computations:

The RobotProcess runs the RobotAgent. RobotAgent implements the interface between the robot control software and either the iRobot Create hardware or the Player/Stage emulation environment. This agent is responsible for low level motion planning and publishing the sensor values to shared memory. It also sends events to $H_2O$ when interesting physical features are discovered.

The H2OProcess runs the H2OAgent and is responsible for combining network and robot state into a meaningful representation of the environment. The H2OAgent publishes this information for other processes to use.

The STPERProcess runs the STPERAgent. It coordinates high-level multi-robot tasks, known as "plays", and selects the appropriate single-robot tasks, or "tactics", based on the role assigned to a robot using available data from other components.

The LinkProcess runs the LinkAgent, which is responsible for maintaining a data structure for the wireless network and routing state. This agent simply publishes this information to shared memory for others to use.

The WiFiListenerProcess receives messages from other nodes and routes them to the correct message queue.

Shared memory and queues built on native libraries can mediate interprocess communication. Each component cam maintain a data structure in shared memory that it periodically updates for the use of other components in their decisions. Each of these data structures can inherit access methods from a base StateManager class, enabling the designer of each component to specify the data access methods in addition to the shared data. This class serves as the interface to all shared state and encapsulates all the complex details of managing the shared memory and queues.

The current implementation provides three message queues, for STP-ER, $H_2O$, and link state data published by the government-furnished radio. The STP-ER and $H_2O$ queues receive communication messages from other nodes (via the WiFiListenerProcess) and from other components within a node. The combination of event queues and shared memory leads to asynchronous interprocess communication, decoupling time-critical control processes from longer-running deliberations.

Component Architecture and Software Design. Modularity and reuse can be inherent in the design of control components according to the present disclosure. The single-writer/multiple-reader design pattern allows different components (capabilities) to be integrated or replaced without modifications to other capabilities. Shared memory and message queues mediate all interaction between components, so integration of a new component only requires spawning a new process that can read the shared state managed by each of the other processes' StateMgr instances. In turn, this new process can share data with others through its own StateMgr instance.

Skills, Tactics and Plays for Exploration and Relay. The implementation of STP-ER is spread across two components, RobotAgent and STPERAgent, corresponding respectively to the "fast" tasks of detailed single-robot motion planning and execution and the "slow" tasks of multi-robot coordination and role assignments.

RobotAgent executes tactics and skills. Each tactic derives from a base Tactic class implementing two primary methods, summarized in Table 1, below.

A Tactic uses a collection of skills (platform-independent wrappers for motion and sensing primitives) and optionally specifies one or more terminal states. When a tactic has a terminal state, it uses shared memory to indicate to the STP-ER process. STP-ER also has the authority to override the tactic and stop its execution at any time. The tactic can asynchronously transmit data encapsulating its "return value" to STP-ER upon completion. If a tactic has no exit condition, it runs until interrupted by STP-ER. The STPERAgent chooses the tactic to execute and, via shared memory, commands the RobotAgent to load it. As the tactic runs, STP-ER can monitor network and physical state to determine if and when the tactic should terminate.

TABLE 1

| Tactic Class Base Methods | Description |
| --- | --- |
| init( ) | Sets the tactic's state machine to its initial state. Performs any other initialization or configuration |
| update(char* data) | Compute the next state for this tactic and execute the required skills<br>Performs other low level control and keeps track of internal state<br>Returns information important to the calling class in data. |

The tactics executed by a robot are determined by its active role. Roles are properties of plays and are implemented as members of the Play object currently active in STPERAgent. The active role designates a set of tactics, test conditions, and messages that one or more robots might effect as part of a play. Each play has one or more roles that may be transferred between nodes executing that play. For example, an exploration play that keeps some nodes fixed while allowing others to identify the perimeter of their rooms would specify EXPLORER and SENTRY roles.

A play is a high level description of a task that needs to be executed. A play contains a set of roles and methods for switching roles, as well as methods for inter-robot communication. Each play has applicability conditions that each robot's STPERAgent periodically tests and exit conditions that identify when it has achieved the desired effect or no longer applies. All plays derive from a base Play class implementing the following methods:

| Play Class Base Methods | Description |
|---|---|
| applicability( ) | Returns a float indicating the "applicability weight" of the play for this robot in the current environment. Used to determine the best play from a set of play's |
| initialize( ) | Sets the play's state machine to its initial state. Performs any other initialization or configuration |
| execute (STPERMsg * msg) | Update the play's internal state by processing the sensors (e.g. odometry and link state) Load/unloads the tactic that is running Returns a message to be sent in msg |
| handleComm (STPERMsg * msg) | Processes a message transmitted by another robot. Can change the state of the play and/or cause a new play to be loaded |
| terminate( ) | Called before the play object is deleted to perform any necessary cleanup |

Upon finding a play with the highest applicability to the given state of the system the STPERAgent loads the play, chooses roles and begins to execute. During play execution the Play instance is self contained and STP-ER simply monitors it and continuously checks for a better play to execute. All skills, tactics, and roles can be reused across different plays, simplifying composition of new plays using existing roles.

Figure 6:
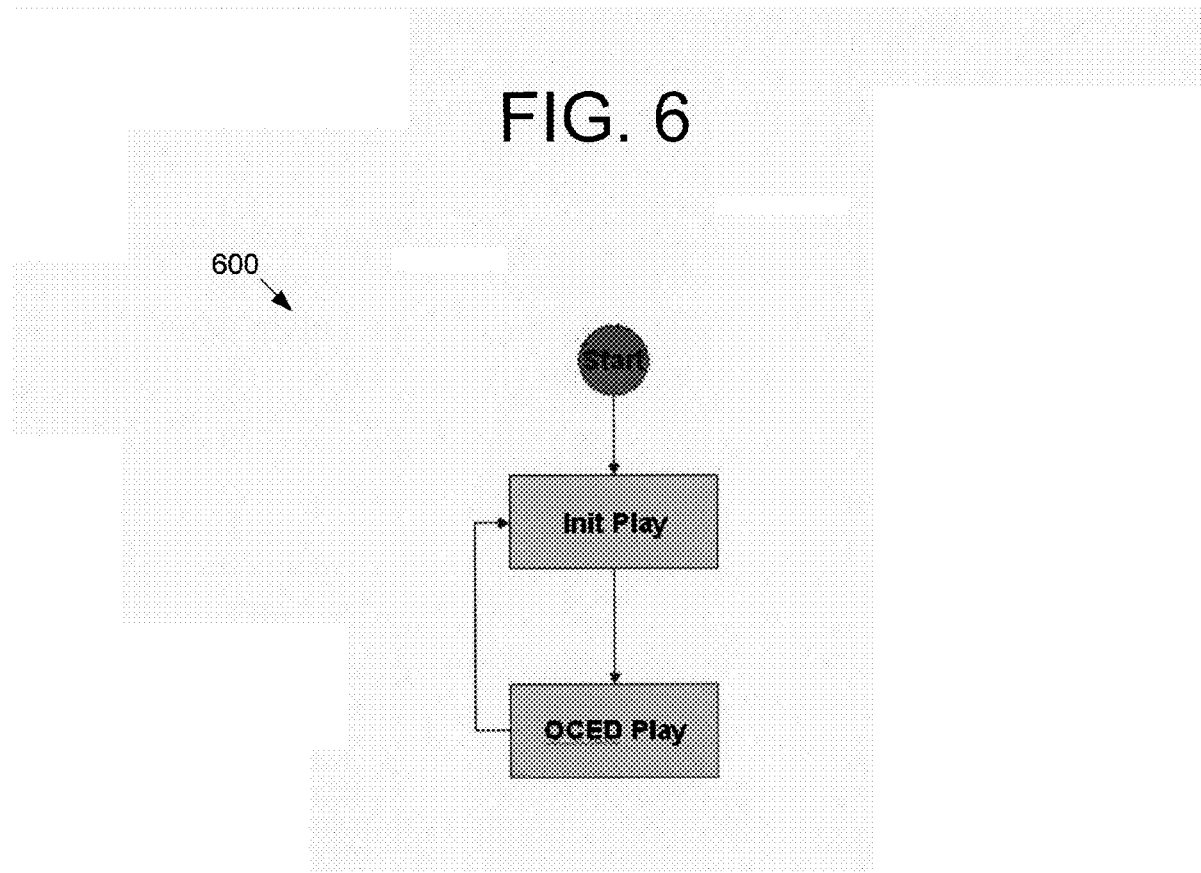
FIG. 6 depicts a scenario of a loop running between an initialization (init) play and an OCED play, in accordance with an embodiment of the present disclosure.

FIG. 6 depicts a scenario 600 of a loop running between an initialization (init) play and an OCED play. Exemplary embodiments include algorithms that can switch between two plays: the Initialization (Init) and Opportunistic Connectivity Edge Detection (OCED) play, as shown for example in FIG. 6.

These two plays can provide a baseline functionality to cover a wide range of difficult problems. Each play fills in the gap where the other fails to perform well in. The initialization play collects data about available links to compute initial points of interest (POIs) and construct a spanning tree. OCED is used mainly for exploring and self configuration where as the Init play is used to detect a good configuration and provide OCED with a good initial state. If OCED fails to connect the network then the Init play can intervene, identify critical nodes, and select which ones should explore more. The switching between then continues until the network is identified to be fully connected; at this point nodes just sit in OCED monitoring the network for any breaks.

Arbitration among the plays is handled by distributed coordination which syncs up all the robots. Implementations can consist of two plays that have a deterministic applicability condition; this condition can be implemented as a Boolean flag, e.g., which tells STP-ER which play to load. The Init Play is applicable when the software has not been initially configured. The basic idea behind the Init Play is to assess the current network and provide feedback as to which robots are in good locations and should remain stationary. The play as can provide an initial state for distributed systems according to the present disclosure. The OCED play is responsible for exploration, optimization, and finding a solution to the network. OCED might in practice be run about 95 percent of the time and give control back to the Init Play upon a few conditions. From the state charts, the plays switch when there state goes to exit.

The initialization play provides robust information exchange of link state between robots. This prevents nodes from making inconsistent decisions as they initialize the network and enables $H_2O$ to construct a uniform global representation. A node executing the initialization play remains stationary while identifying all other nodes that are running the same play, then reliably exchanges link state information across nodes, and finally computes a spanning tree of the network. The initialization play uses several timers to guarantee termination, and defines a specific exit condition. The purpose is to gather the necessary information for H2O to compute the spanning tree. Upon completion H2O will have computed a spanning tree for the network; this information lives in shared memory and can be accessed from anywhere in the system.

The following are play states for initialization play, according to exemplary embodiments:

Play object created. The play starts by initializing all of its variables and clearing the average POI (point of interest, i.e. node information) in $H_2O$. A POI entry for node n contains all of the routing, position, and link quality measurements from node n to all other nodes. The play then enters the WAIT state.

WAIT. A robot performs one operation in this state: it collects all POI data and averages it. This enables a significant base of RSSI measurements when computing link quality. After the wait timer expires, the play transitions to the AVERAGE_POI state.

AVERAGE_POI. This state allows additional time for POI averaging and delays action while other nodes to join the network. The robot emits a "hello" packet to alert other nodes of its state and listens for other "hello" messages. The robots synchronize and collect additional POI data by replying to each "hello" message with another "hello". After the timer expires the robot can assume that i has heard from all neighbors running the initialization play; $H_2O$ stops averaging POI data and the robot transitions to the SEND_AVG_POI state.

SEND_AVG_POI. In this state, all participating nodes exchange the POI data they measured directly and received from neighbors. This propagates RSSI data across multiple hops, enabling each node to build an RSSI graph of the whole network. Once a node has received RSSI data from the full network, or its timer expires, it transfers to the WAIT_N_SEND state. Upon transition to the WAIT_N_SEND state, the play writes a list of POI's to $H_2O$'s message queue.

WAIT_N_SEND. This state adds robustness to the data exchange and allows additional time to transmit the average POI. After a timeout the play tells $H_2O$ about all the nodes that sent it a hello and then tells $H_2O$ to compute a spanning tree of the network. After this the play sets a flag which alerts STP-ER to switch to the OCED play.

Table 2 summarizes the tactics used in the initialization play. The initialization play consists of four states. For initialization play, it is preferably that nodes remain stationary throughout.

TABLE 2

| State | Tactics used |
|---|---|
| WAIT | FREEZE |
| AVERAGE_POI | FREEZE |

TABLE 2-continued

| State | Tactics used |
| --- | --- |
| SEND_AVG_POI | FREEZE |
| WAIT_N_SEND | FREEZE_N_BEEP |

The message handling is quite simple for the initialization play. If the node receives a "hello" message or a POI update it adds it to the corresponding list and waits for another message (see FIG. 7).

Figure 7:
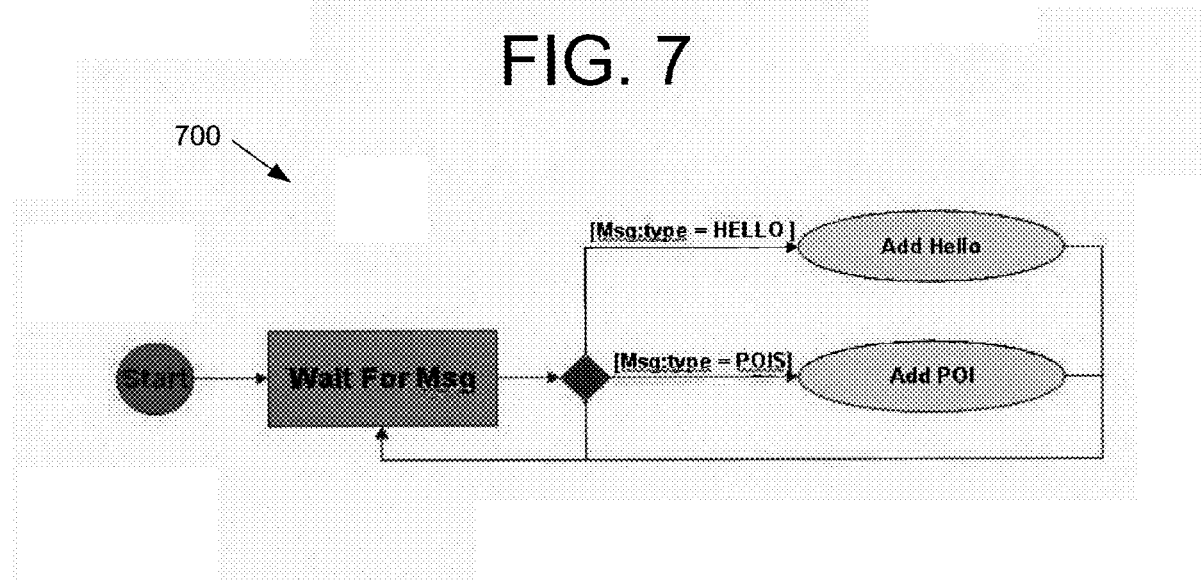
FIG. 7 depicts a diagram of the message handler for the initialization play from adjacent nodes, in accordance with exemplary embodiments of the present disclosure.

In the diagram 700 of FIG. 7, the message handler for the initialization play accepts hello and POI messages from adjacent nodes.

Figure 8:
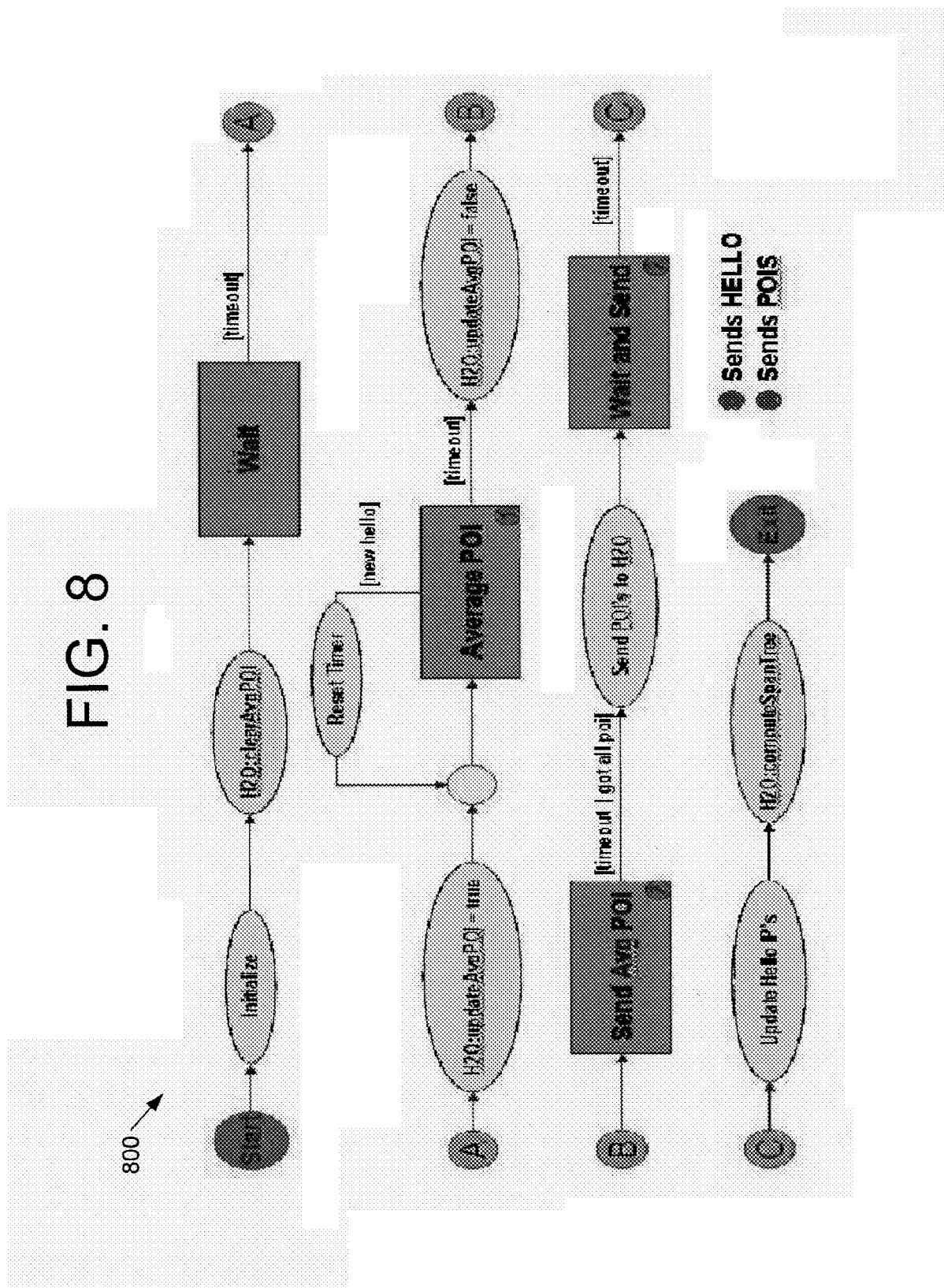
FIGS. 8-11 are diagrams depicting OCED play, in accordance with exemplary embodiments of the present disclosure.
Figure 9:
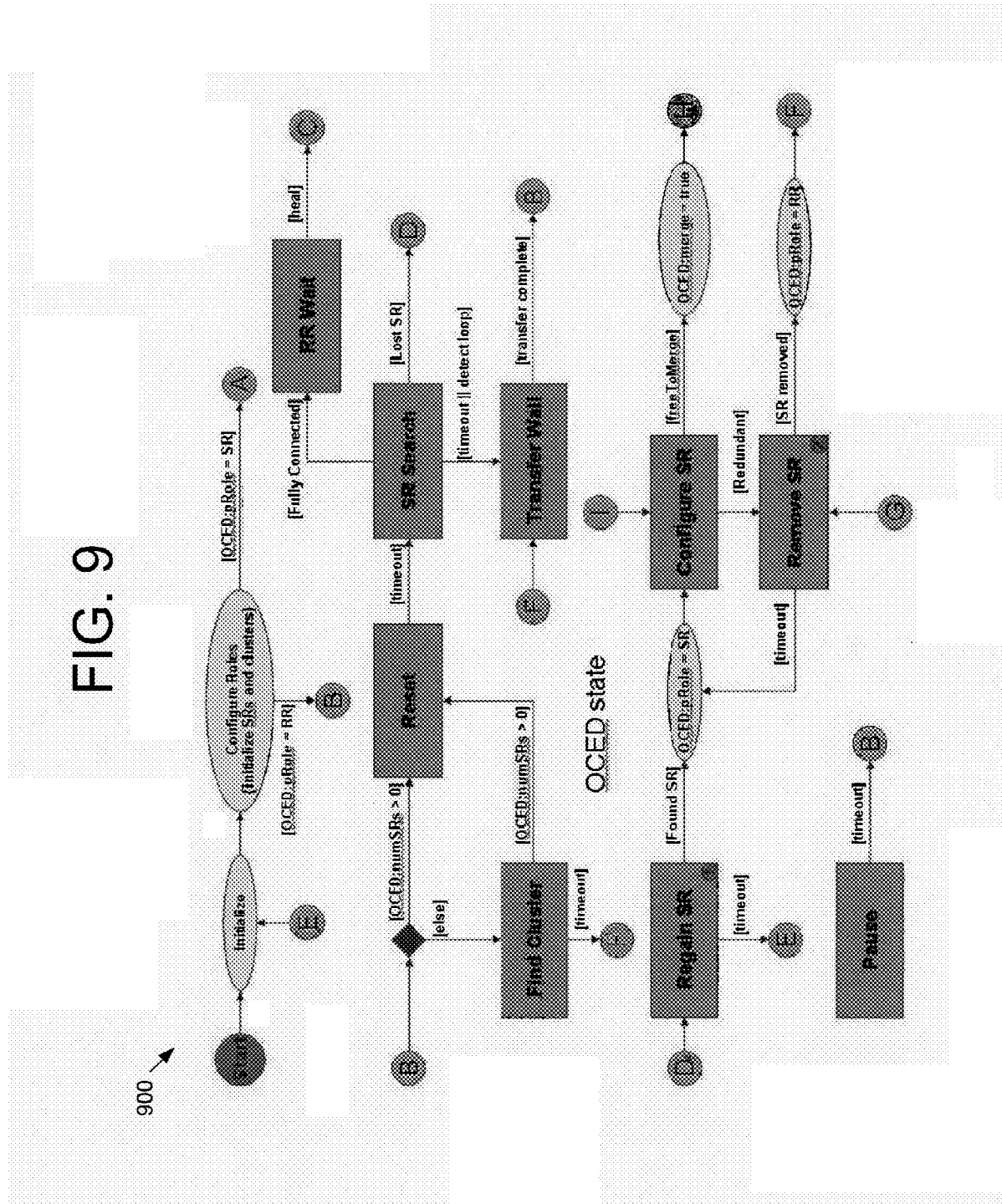
Figure 10:
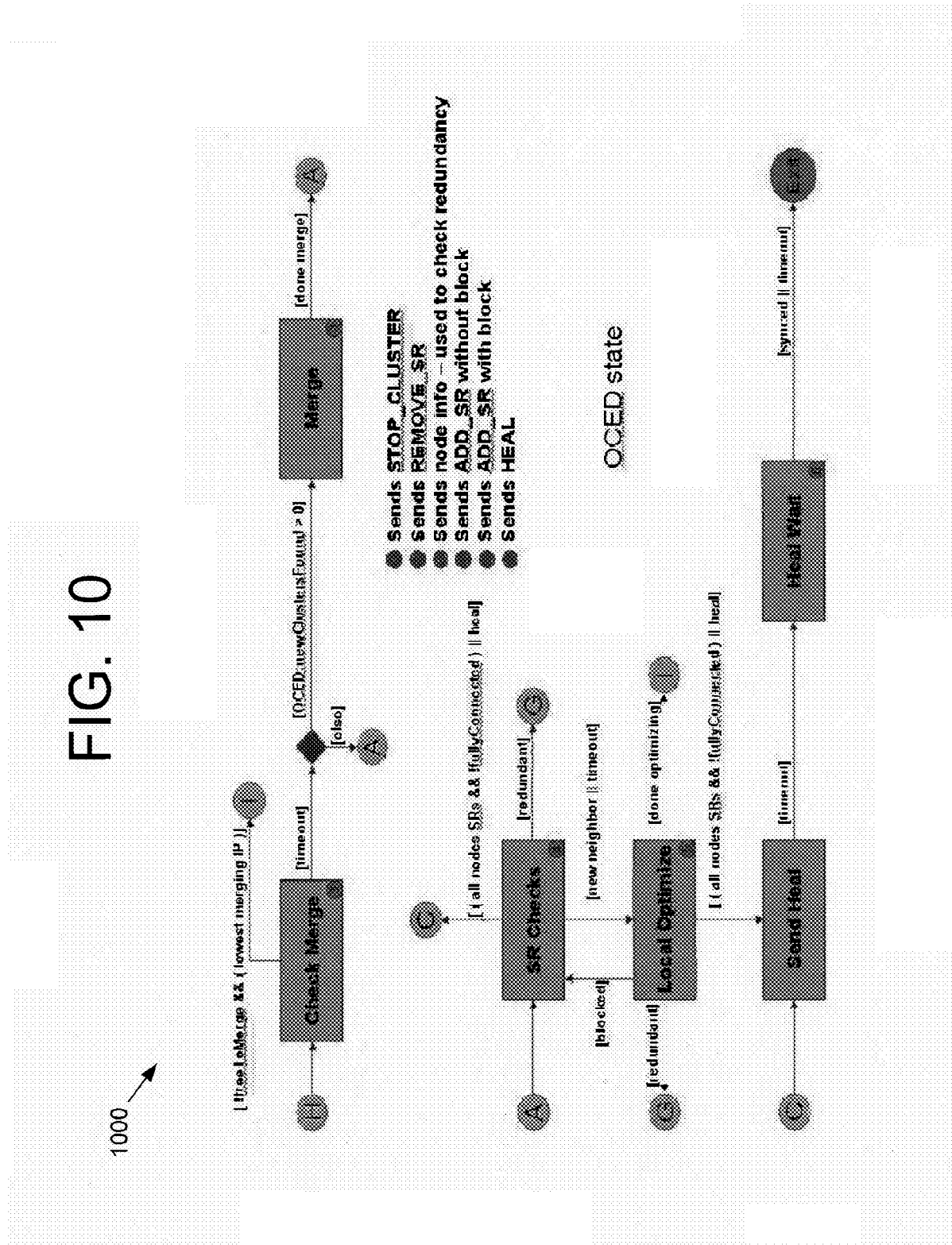
Figure 11:
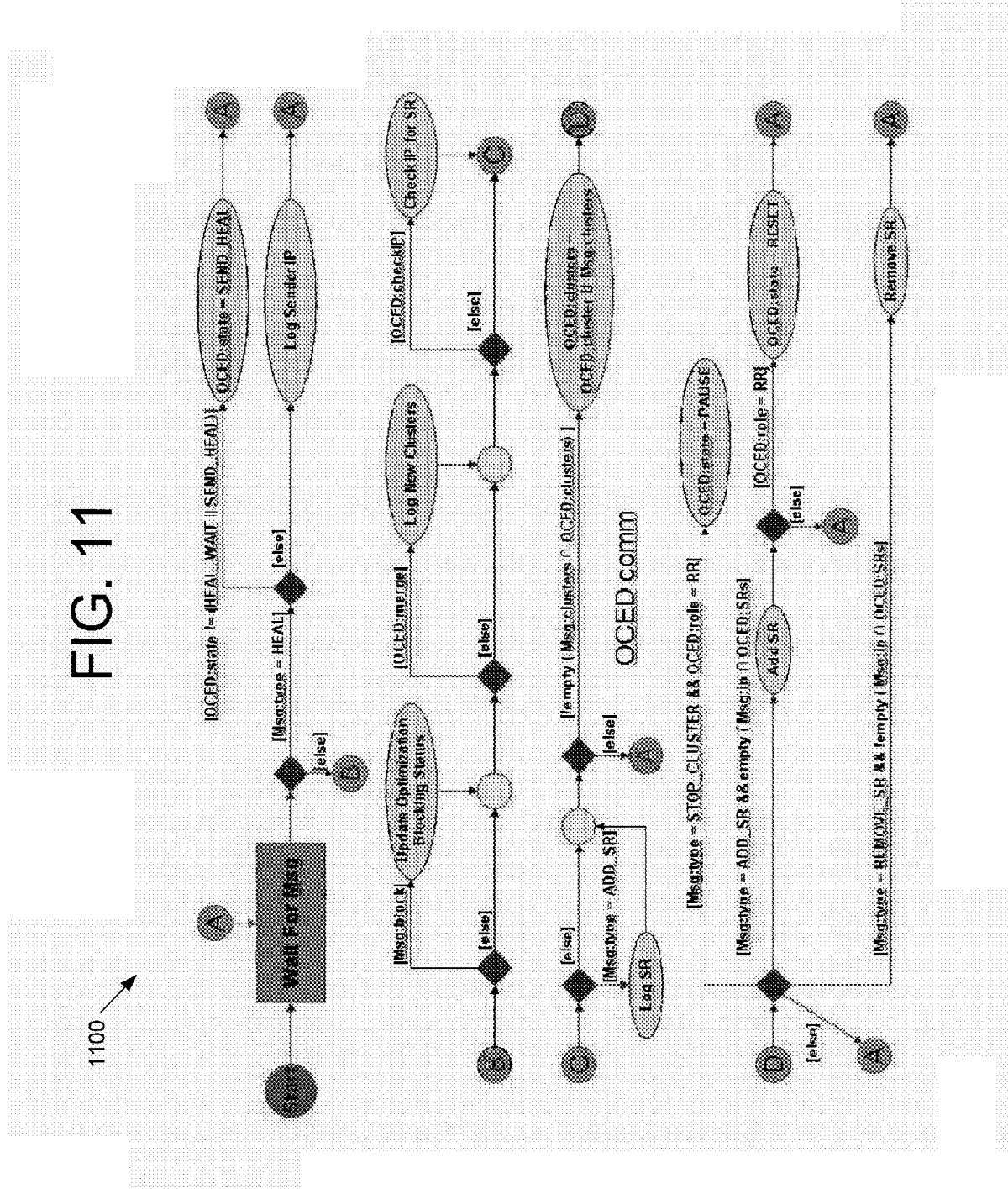

In FIG. 8, the OCED play 800 consists of multiple states for discovering, establishing and maintaining stationary relays (SRs) and roving relays (RRs). Opportunistic connectivity edge detection (OCED) follows the termination of the initialization play and creation of a spanning tree. Robots executing OCED explore their deployment region and form a wireless networking backbone that maximizes coverage for known warfighters. Unlike the initialization play, OCED runs indefinitely until an event like a node failure forces a transition out. OCED runs for most of the network lifetime. It requires minimal communication overhead and is very robust to incomplete or delayed information.

OCED implementation can assign three key roles to nodes in the network:
   Stationary relays (SRs) are robots that have fixed their location and occasionally self-optimize to improve throughput;
   Roving relays (RRs) are usually in motion and provide supplemental connectivity throughout the network; and
   Clusters are nodes other than the robots that still participate in the network, like a gateway or warfighters.

The OCED algorithm tethers a Self-organizing mesh node to a cluster by finding the edge of the region where that node can reliably connect to the cluster and stationing itself there. Each node explores until it finds a cluster, then joins that cluster and continues to explore. As soon as it loses connectivity with the cluster, it turns around to regain the connection and stops when it has done so. After it stops, the node checks whether it is in range of another cluster, and merges the two into one if it is. Once a node has become stationary and joined a cluster, other nodes may tether to it. OCED grows a sparse network outward from clusters, and given sufficient resources will eventually connect all clusters together.

Upon Setup, a Play Object is Created. Upon creating by STP-ER the OCED play initializes all of it variables (clears all lists, sets timers to 0, sets thresholds etc.) and assigns SR or RR roles to nodes based on the spanning tree. All nodes within a connected component start with the same information and therefore have an identical view of the network. If a node selects an SR role then it adds all other SRs and connected clusters in its component to its local list. This ensures that only stationary nodes have an initial state, while roving ones start with a cleared state for more efficient exploration. If a node is a SR then it transitions to the SR_CHECKS state and if it is an RR it transitions to the FIND_CLUSTERS state.

The following are states for Exploration.

FIND_CLUSTERS. A node that has no SRs uses this state to find an SR to connect to, thereby growing the network. In each iteration, a node: Determines its one-hop neighbors; Measures link reliability to each; and Determine whether to join the connected component of a neighbor with a reliable link.

It is important to note that when the neighbor is a Self-organizing mesh node and not a gateway or a warfighter then the node listens for an ADD_SR message from that neighbor (ADD_SR messages are only transmitted by nodes in states capable of accepting new neighbors). A node transitions from FIND_CLUSTERS to the RESET state after joining a cluster, and transitions to TRANSFER_WALL (temporarily gives up searching in the current direction) if the FIND_CLUSTERS timer expires.

RESET. This state simply resets some variables and clears some lists. It is similar to the first state of the initialization play but does not reset all of the state variables; namely the SR and cluster lists. It transitions immediately to SR_SEARCH.

SR_SEARCH. A node enters this state with a good connection to at least one SR. A node in this state moves around until it loses connectivity to all its adjacent SRs, continuously measuring its RSSI as it moves to find the boundaries of the connectivity region for each. Once the signal for each neighbor is too weak to connect, the node transitions to the REGAIN_SR state. SR_SEARCH includes a "holding" algorithm that records signal strength to new connected components encountered during the search process as well as those already known. The "holding" algorithm enables a node to reuse accidental discoveries made during the boundary search after it leaves the SR_SEARCH state.

There are three other conditions that trigger a transition out of SR_SEARCH: full connectivity, loop detection, and timeout. As soon as a node detects that the network includes all warfighters and base stations, the network can terminate exploration and the node can transition to the RR_WAIT state. The "holding" algorithm also enables a node to track the new neighbors it encounters and in what order, and uses that ordering to detect whether it has completed a loop on the map, in which case it transitions to TRANSFER_WALL. Finally, a timer prevents fruitless exploration in an unoccupied direction.

TRANSFER_WALL. This state is very simple; the node changes direction and proceeds until it bumps something. This state releases a node from a bad location. A main exploration tactic is a unidirectional wall follower, so a wall transfer also effects a change of direction. A node transitions to RESET after a successful wall transfer.

RR_WAIT. This state is also very simple and is reach only by RR's when the network is fully connected. Basically this state stops the node and monitors all neighbors for healing. There is only one way to transition out of this state and it happens upon sensing a neighboring node was powered down. The node transitions the SEND_HEAL state.

REGAIN_SR. In this state, a node backtracks and regains the connections it lost during SR_SEARCH. Once it regains connectivity, it becomes an SR. If it fails to find the lost cluster it will timeout, then fully reinitialize, clearing all erroneous state information and enabling the robot to rebuild its local state representation. Upon finding a connection to the lost cluster it transitions to the CONFIG_SR state. In this state the node sends out a STOP_CLUSTER message which causes all neighboring nodes in the same cluster to transfer to the PAUSE state. The reason for this is to avoid any interference while the node is trying to backtrack and regain its connection.

PAUSE. Only nodes which are assigned a role of RR can enter this state. When any neighboring node in a cluster becomes an SR, it has to backtrack to regain a connection. During this backtracking it asks all other nodes to stop moving and wait for it to complete the motion. Once the node completes the backtracking and becomes an SR, all paused nodes enter the RESET state. This state will update the state variables with the new added SR and start the SR search again.

Network merging. Ad hoc deployments may result in multiple connected components forming, requiring nodes at the frontiers between components to merge. The CONFIG_SR, CHECK_MERGE, and MERGE states effect such merges while avoiding deadlock.

CONFIG_SR. This state mediates between two nodes that try to simultaneously enter the MERGE state. Upon entering CONFIG_SR, a node uses the POP_N_FREEZE tactic to push itself away from the wall and position itself in the middle of the room/hallway. It then waits for a random back-off interval. If it detects no other nodes in the MERGE state after the back-off timer expires, it transitions to the CHECK_MERGE state. This transition sets a merge flag that tells the message handler to look for new clusters. When a node is in the CHECK_MERGE or MERGE states, it periodically sends out a node info packet. Upon receiving such a packet a node adds it to a list which is periodically pruned at a desired timeframe, e.g., 4 seconds (this means that if an update is not received within 4 seconds it no longer is in the list). The function freeToMerge checks for existence of such entries in the node info list. If there are any present then this means another node is in the merging state and its transition should be waited out. This state is a gate that coordinates nodes to ensure only a single node is merging at a time. While a node is waiting to merge it checks redundancy with respect to the merging node. If the node finds itself to be redundant then it transitions to the REMOVE_SR state. Merging states are a type of updating for the global state of the network; because of this it is preferable that no more than one node attempt this simultaneously.

CHECK_MERGE. This state listens for new clusters and broadcasts the node information received by the radio. At most one node per connected component may occupy this state at a time. This is guaranteed by the state information transmitted by a node in CHECK_MERGE and ensures that only one node at a time updates the global state required to merge two components. After waiting for a backoff timer to expire, a node checks if it has received messages from any new clusters. If so, it transitions to the MERGE state, otherwise it transitions to the SR_CHECKS state.

MERGE. Only a single node in the network can be in this state. This state is entered after the CHECK_MERGE state has identified one or more new clusters. In this state the node checks the link quality to new clusters and determines whether the cluster should be merged; if the link quality is good enough the node adds the new cluster to its cluster list. The new cluster information propagates through the network so that all other connected node in the component will add it. This state also broadcasts the node information so that all other SR's in the network can check redundancy. This state simply runs for a finite time to collect information on the quality of the links to the new cluster and then transitions to SR_CHECKS.

REMOVE_SR. This state is entered after a node has declared itself redundant. Each node that declares redundancy knows the identity of the node which it is redundant with. Upon the redundant (other) node becoming an SR it sends out a message alerting all other nodes to remove it from there SR list. This process goes on for 15-20 seconds and then transitions to TRANSFER_WALL. There are some cases where the node that is redundant never becomes an SR, in this case the node transitions back to CONFIG_SR because any motion may break the network.

SR_CHECKS. This is the most common state for stationary nodes. This state can be thought of as "monitoring the network". Nodes in this state check link quality, failed nodes, and connectivity. Each node monitors the RSSI to each of its next hop neighbors that are also SRs and transitions to LOCAL_OPTIMIZE if connectivity falters for one or more of them. A node will also transition to LOCAL_OPTIMIZE if it detects a new SR neighbor. All nodes in this state monitor for redundancy; as a node becomes an SR it queries all connected SR nodes to determine whether they have identical neighbor sets, in which case the node transitions to the REMOVE_SR state. A node may also transition from SR_CHECKS to SEND_HEAL if it detects a failed neighbor or detects that all connected nodes are SRs but the network is not fully connected. The latter case occurs when OCED fails to find a solution and needs to re-assess the state of the network to try again. This state sends out an ADD_SR message without a blocking flag to let other nodes know that they can tether and join to it.

Local optimization. One state manages local signal strength optimization:

LOCAL_OPTIMIZE. Only SR nodes may attempt to self-optimize upon detecting a bad connection. A self-optimizing node remains in the SR role in this state and therefore continues some of the network monitoring done in SR_CHECKS: it checks for redundancy, failed nodes, and stagnant network (as in SR_CHECKS) and has the same outgoing transitions. A node transitions to the CHECK_MERGE state when self-optimization is complete because its new location may make another node redundant or enable it to join two clusters successfully. If a self-optimizing node detects any other node in one of the merging states, it freezes to enable consistent RSSI measurements. A node reverts to SR_CHECKS on completion and sends out an ADD_SR message with the blocking flag set to true to prevent adjacent nodes in a one hop neighborhood from optimizing simultaneously.

Self-healing. Two states perform self-healing, in exemplary embodiments:

SEND_HEAL. This state is transitions the network to the initialization play so it can recomputed the current topology in unison. It clears some variables, then transitions to HEAL_WAIT.

HEAL_WAIT. A node in this state sends HEAL messages until it verifies that all connected nodes are in this same state. The network then transitions together to the initialization play. All nodes receiving a HEAL message go through SEND_HEAL first and then sync up in this state. Completion of this state results in the destruction of the current OCED instance and instantiation of a new initialization play.

Table 3 summarize OCED states/tactics, in accordance with exemplary embodiments of the present disclosure.

TABLE 3

Tactics used in the OCED Play

| State | Tactics Used |
|---|---|
| FIND_CLUSTERS | FREEZE, H2O_FOLLOW_WALL |
| RESET | FREEZE |
| SR_SEARCH | FREEZE, H2O_FOLLOW_WALL |
| TRANSFER_WALL | FREEZE, WALL_TRANSFER |
| RR_WAIT | FREEZE |
| REGAIN_SR | FREEZE, REVERSE_FOLLOW_WALL |
| PAUSE | FREEZE |
| REMOVE_SR | FREEZE |
| CONFIG_SR | FREEZE, POP_N_FREEZE, |
| CHECK_MERGE | FREEZE_N_BEEP |

TABLE 3-continued

Tactics used in the OCED Play

| State | Tactics Used |
|---|---|
| MERGE | FREEZE_N_BEEP |
| SR_CHECKS | FREEZE, FREEZE_N_BEEP |
| LOCAL_OPTIMIZE | FREEZE, FREEZE_N_BEEP, H2O_SPOKER |
| SEND_HEAL | FREEZE |
| HEAL_WAIT | FREEZE |

The message handling for the OCED play is somewhat complex. If an incoming message is of type HEAL, the play checks whether it is in one of the two healing states. If not, it transitions into the SEND_HEAL state; if so, it simply logs the sender identity of the HEAL message (this data is tested to see if all nodes are in the HEAL_WAIT state). If the message is not of type HEAL then it is checked for blocking, merging, or joining.

If the message's blocking flag is set to true then the node saves the sender identity IP of the node that send the message. This flag is unset upon receipt of a message from the same node with blocking set to false.

The CHECK_MERGE state sets the merge flag to true, telling recipients to log clusters that they overhear that they do not belong to. Although there may indeed be a connection to another cluster that connection may not be good and thus it should be logged to, to allow OCED to determine if it is good enough.

The checkIP flag is set to true for nodes that belong to no cluster and have found a connection to one through another node. This flag simply tells the message handler to verify if this connection is through an SR or RR and to initiate a join if the intermediate node is an SR.

Once a node has verified that an incoming message came from a node in its cluster it processes the message type. The first type is ADD_SR which adds the new SR to the list and also forces an RR into the RESET state. This allows a node to reset its link measurements and incorporate the new SR node. The message type STOP_CLUSTER is sent out by nodes trying to become an SR. If the recipient is an RR, a STOP_CLUSTER message forces it into the PAUSE state. The last message type is REMOVE_SR, which is self explanatory. Tactics for exemplary embodiments include the following, though others may of course be realized:

FREEZE. The FREEZE tactic stops a robot's movement.

FREEZE_N_BEEP. The FREEZE_N_BEEP stops a robot's movement and forces it to emit a beeping sound. This tactic is used mainly to convey node status to testers.

POP_N_FREEZE. This tactic moves a robot away from a wall to improve signal propagation.

WALL_TRANSFER. The WALL_TRANSFER tactic allows a robot to change its direction of exploration while using a wall-following exploration heuristic.

REVERSE_FOLLOW_WALL. The REVERSE_FOLLOW_WALL tactic uses the bump sensor to follow along a wall in the direction opposite that support by the Create platforms single side-facing proximity sensor.

H2O_FOLLOW_WALL. The wall following tactic tracks the contour of the wall at a constant distance using nonlinear feedback control, replacing the basic bang-bang used in earlier development iterations. Unlike methods that use sequences of arch-shaped motions, this method uses the continuous measurements from the infrared wall sensor to follow the wall, driving straight where the wall is straight. It is able to drive at the top speed of the robot. The innovation is in linearizing the wall sensor signal to enable the use of proportional-derivative control.

The main component of the wall following algorithm is the wall tracker. By analyzing the equations of motion of the system, it was shown that the angular rate of the robot can be used to effectively track a line. The angular rate can be set proportional to the cross-track error of the robot to track the line, and the derivative of that error. The wall sensor's signal strength was found experimentally to be approximately linearized by taking its square root. By proper selection of gains, angular rate feedback using this error metric to estimate cross track error results in an algorithm that is effective on all surface types tested.

Two states must be guarded for in the wall following algorithm. First, the robot can bump the wall. When this occurs, it is commanded to spin away from the wall until it is freed. Second, the robot can be put in states where it is far away from the wall. This is detected by observing a wall signal below the threshold for a sustained amount of motion. When the robot has turned 360° without sensing a sufficiently high wall signal, it drives straight until it encounters a wall.

Figure 12:
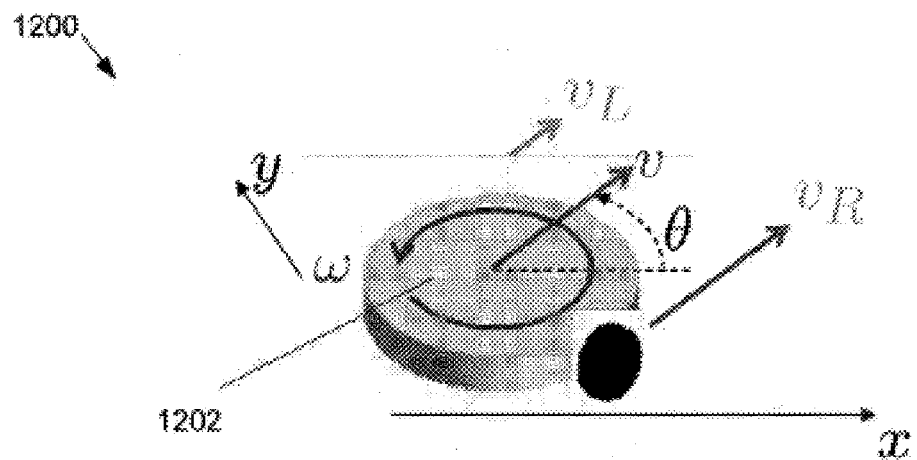
FIG. 12 is a body diagram showing dynamics of a vehicle, e.g., a robotic relay node, in motion, in accordance with an embodiment of the present disclosure.

FIG. 12 is a body diagram 1200 showing dynamics of a vehicle, e.g., a robotic relay node, in motion. It will be understood that the vehicle 1202 shown is simplified and in fact such a robot may be more complex. The vehicle (robot) 1202 can include a locomotion system, e.g., with one or more drive wheels and corresponding motors, which can be controlled by a control system. The vehicle (robot) can also include a communications system, e.g., a RF system, operable for transmitting and receiving signals (e.g., RF) to and from other components of a network, e.g., a self-configuring mesh network as described herein. The vehicle (robot) can further include a sensor system with a sensor suite, e.g., a bump sensor and/or other sensors. The sensor system can send output signal to the control system for use in navigation, RF and environmental map building/maintenance, etc.

The algorithm is implemented using the states depicted in FIG. 12. To achieve angular velocity $\omega$, speed is subtracted from the commanded left wheel velocity $v_L$ or right wheel velocity $v_R$, as appropriate to achieve the correct direction of turn, which may be measured as an angle $\theta$ from the x axis. In doing so, the top speed v of the vehicle can be regulated. It can also be split between the wheels, but with the remainder from saturation on any wheel being shifted to the other wheel. The commands are further saturated at the limits of the wheel. To estimate cross track rate, the finite differenced wall signal in low pass filtered using a first order discrete filter. To stay above a minimum radius of curvature, the absolute difference between the wheel speeds is saturated to remain within preset bounds.

Figure 13:
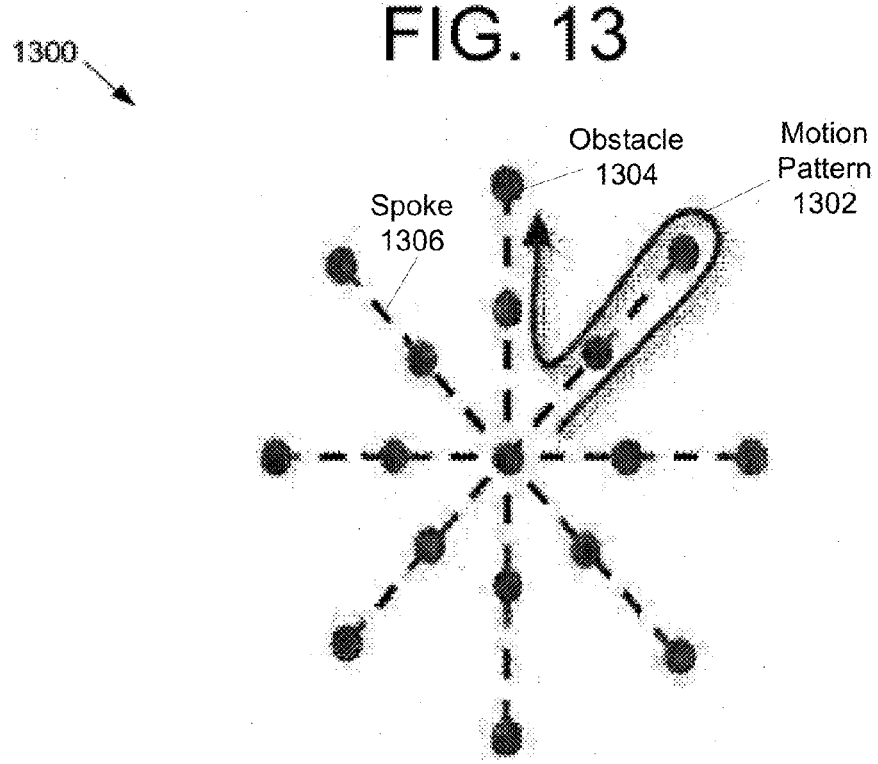
FIG. 13 depicts a spoke movement pattern of a robotic relay node, in accordance with an embodiment of the present disclosure.

H2O_SPOKER. This tactic addresses the well-known problem that structures can either amplify or attenuate signals depending on their composition and size, but the composition of the surroundings is typically not observable. This tactic maneuvers the robots to optimize their wireless network properties locally within a potentially cluttered environment and does not require assumptions about continuity of radio strength, physical obstacles, or globally available position information. It maneuvers the robots in a "spoke" pattern, e.g., as shown in FIG. 13, to acquire measurements of signal quality from other radios in the network that are deemed important using metrics exterior to this tactic. The robot makes measurements of radio characteristics either at key points or continuously. It may use any of several metrics to assess the quality. A utility function is evaluated to select the optimal location among the visited set, and this location is driven to, achieving a locally optimal positioning of the radio.

FIG. 13 depicts a diagram 1300 of a "Spoke" or "Spoker" motion pattern 1302 around obstacles 1304, which form spokes 1306. The spoke pattern only requires bump sensing for execution, regardless of the obstacle environment. This reduced need for sensing and mapping is guaranteed because the spoke pattern is in the visual hull of the robot's original position, therefore if a spoke cannot be completed due to an obstacle, the return path is simply to drive in reverse. Experimental results show that the quality of wireless signals often varies substantially on the single-meter scale. By making detailed measurements at this scale, substantial improvement in radio performance can be realized. Closed loop control can be used to drive to goal points on the spokes. The odometry from each wheel can be used to estimate and correct vehicle drift to increase accuracy and compensate for anomalies.

The spoker tactic can consist of three components: an overall state machine that progresses through each spoke and measures the signal strength; a utility function (such as sum-of-RSSI or product-of-RSSI); and a closed-loop controller implementing "turn-to-heading" and "go-to-point" skills to traverse the spokes.

Hierarchical, Hypothetic, and Opportunistic Localization, Map-Building and State Estimation ($H_2O$) can include $H_2O$ Data Structures. Mapping and localization provide an integrated representation of physical space and networking connectivity to enable context-driven decisions for STP-ER, including play selection, role binding and change of tactics. Implementations must maximize situation awareness with minimum coordination cost; efficiently construct a global map with limited and noisy sensing; and efficiently use global and local maps of physical and RF environments. $H_2O$ implements a framework providing four types of data:

Radio topology (H2O_NetworkTopology): Tracks the current radio RSSI connectivity between any two nodes in the cluster. This information is critical for making global decisions among all nodes in the cluster, since all nodes in the cluster should have the same topology information. In particular, this can be used to determine which nodes connect to the gateway or war-fighters. It can also be used for a global optimization to determine which nodes should move and which should stay, depending on their connectivity in the cluster.

Region of exploration (H2O_Region): Odometry-based region construction. Each region is rectangular, with a center and four boundaries, and has an orientation in the robot's reference frame. Each region also has type, such as UNKNOWN, ROOM or HALLWAY, etc. The region information is local to each robot since they have their own reference frames. The sharing of regions among robots is not possible unless relative positions are computed. It may be computationally intensive to compute relative position with the low-cost sensor suites (e.g., radio features) to measure distance between robots. Better signals (e.g., ultra-wideband, ultrasound, camera, etc.) would likely facilitate sharing regions. H2O_Region can be used for navigation around an area, identifying explored areas and using region types to guide different motion tactics.

Radio matrix over points of exploration (H2O_RadioMatrix): Represents a radio map between points in space explored by nodes, including gateway, test points and other landmark nodes. Note that H2O_RadioMatrix is a super-representation of H2O_NetworkTopology. H2O_NetworkTopology can be used for computational efficiency. H2O_RadioMatrix has not only the current radio connectivity in the cluster, but also the connectivity history for the node. H2O_RadioMatrix grows with the number of point of interests (bullet 9) published by nodes. H2O_RadioMatrix can be used to compute optimal connectivity, and globally connected subgraphs, as well as 2D geolocations if better ranging technique can be deployed for Phase II.

Spanning Tree: An optimal backbone that connects all war-fighters and the gateway in the cluster. The spanning tree can be computed from H2O_NetworkTopology and H2O_RadioMatrix. The spanning tree is the major source of data for deciding which nodes are to explore and which to stay as relays for transferring user data to the gateway.

In addition, there are several support data structures that can be included in exemplary embodiments of the present disclosure:

H2O_NetworkInfo: Records all nodes that are currently or previously in the cluster with the current node, H2O_NeighborTable: A reformulation of the neighbor/routing table sent from a radio API, with additional APIs to check for current radio neighbors, current cluster nodes, and existence of the gateway in cluster, as well as how many war-fighters are in the cluster, H2O_RadioFeature: Represents the property of one-hop connections, including average and standard deviations of RSSI, received samples, and cost of transmission. H2O_RadioFeatureSet represent a set of radio features received from a set of nodes, e.g., the set includes gateway and all war-fighter nodes. H2O_RadioFeature and H2O_RadioFeatureSet are used in H2O_RadioMatrix to characterize pair-wise radio properties between two locations.

H2O_WayPoints: Record the list of waypoints saved from tactics, with information on bumper states and odometry. H2O_WayPoints are used to compute H2O_Region properties, such as wall orientation, area type and size.

H2O_POI: Represents a point of interest (POI) in H2O_RadioMatrix, including the node identifier and the 2D position in its own reference frame. H2O_RadioMatrix maintain H2O_RadioFeature between two H2O POIs, and the position sequence of H2O_POIs for each node.

H2O_TraceSegment: Represents trace segments for wall following tactic, extracted using odometry information.

The following are H20 algorithms in accordance with exemplary embodiments.

Position Estimation. The position estimation algorithm fuses vehicle odometry sensors with issued commands to estimate the location and orientation of the robot. The algorithm compensates for round-off error that is introduced every time the odometry sensor is polled and inaccuracy in tracking issued commands.

Wheel odometry is measured using encoders on the wheels of the robot that measure the angle turned by the wheel shafts. An accumulator in the processor on the robot counts ticks of the encoder. When the accumulator is polled, it is reset to zero, the distance is rounded to millimeters and the angle is rounded to degrees, and the remainders from rounding are lost. If the sensor is polled too frequently, it always returns zero.

Figure 14:
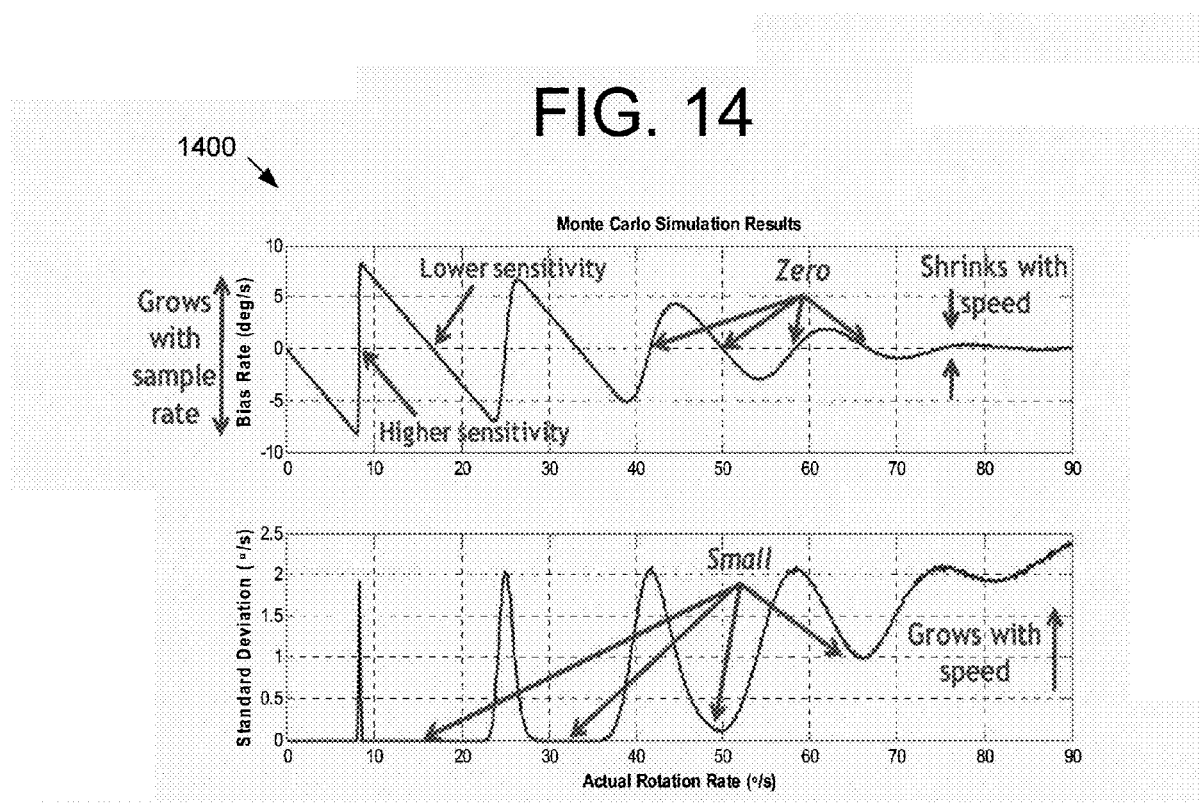
FIG. 14 depicts results of position estimation using simple odometry integration using Monte Carlo simulations, in accordance with an embodiment of the present disclosure.

A conventional odometry integration approach addresses the round-off effect as noise due to vehicle motion, approximating the standard deviation of the measurement as proportional to the square of the robot's speed. The results 1400 of position estimation using simple odometry integration are shown in FIG. 14, using Monte Carlo simulations. The mean and standard deviation of the error were found. To summarize the results, the position estimate has a bias and standard deviation that depends on speed (as shown by the "Higher sensitivity," "Lower sensitivity," and "Small" portions of FIG. 14); the bias and standard deviation are proportional to the sampling rate; the speeds that have zero bias as shown by the "Zero" portions in FIG. 14) are sensitive to actual speed variation as shown by the "Shrinks with speed" portion in FIG. 14); and as speed increases, variance due to uncertainty from motion begins to dominate (as shown by the "Grows with speed" portion in FIG. 14).

These results confirm the results seen by hobbyists and researchers. Bias is worse at some low speeds but not others. The sampling rate cannot be simply reduced to reduce the error bias rate because the velocity of each wheel must undergo a nonlinear integration to establish robot orientation and position at a rate similar to the rate at which the vehicle maneuvers, using the simplified model 1200 shown in FIG. 12. The method used here enables a reduced sampling rate through a specialized use of the low-rate odometry data to augment estimation using control inputs.

The H$_2$O position estimation method predicts the vehicle change in position at the same rate as the control inputs are issued using the vehicle model. It simultaneously accumulates an estimate of the total distance traversed. The odometry accumulator itself is polled at a slower rate, reducing the accumulated error proportional to the time between samples. When the updated odometry value is received, the estimated vehicle heading is set equal to the odometry value. When the rate is low, this value is more accurate than integrated control inputs because it is a measure of the cumulative effect of the control inputs. The change in position of the vehicle, since the last odometry measurement, is scaled by the ratio of the odometry measurement of the distance traveled to the estimated distance traveled due to control inputs. This specialized method is superior to Kalman filtering for this application due to explicitly addressing the sources for noise.

Figure 15:
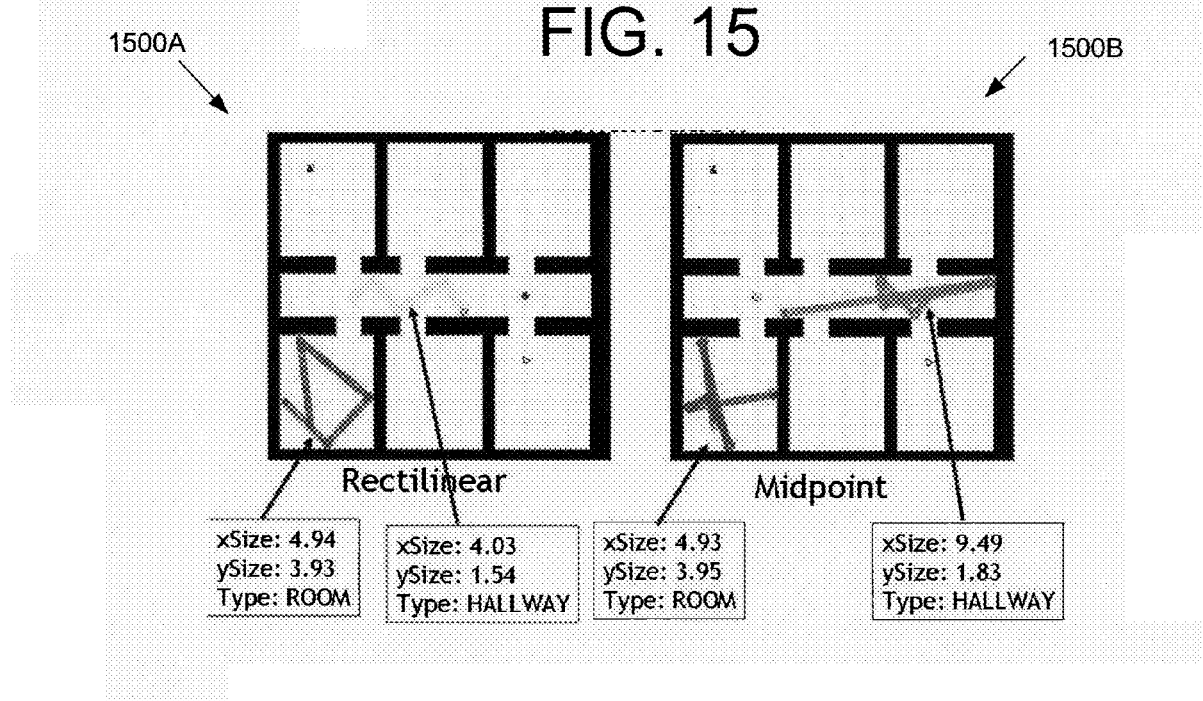
FIG. 15 depicts examples of area size computation, for exemplary embodiments of the present disclosure.

Area Type and Size Computations can be made for exemplary embodiments. It is important for a robot to quickly recognize the type of area it is in (hallway or room), the orientation of walls (to align itself with the wall), and the size of the explored area. The inference has to be based on limited sensing (two bumpers and a wall sensor) and noisy odometry. The following simple tactic that can compute the information. For example, FIG. 15 shows a ROOM calculated as having a width of 3.93 and length of 4.94 connected to a HALLWAY calculated as having a width of 1.54 and a length of 4.03. FIG. 15 also shows a ROOM calculated as having a width of 3.95 and a length of 4.93 connected to a HALLWAY calculated as having a width of 1.83 and a length of 9.49.

H$_2$O can implement a general and simple method for area size and type computation using wall orientation. A wall orientation distribution p($\theta_a$) can be maintained. Every time a possible wall orientation $\theta_r$ is detected by the firing of the wall sensor and one or both bump sensors, the orientation distribution is updated by $p(\theta_a|\overline{\theta}_r^{k+1}) \propto p(\theta_r|\theta_a) \cdot p(\theta_a|\overline{\theta}_r^k)$ according to a Gaussian error distribution $$p(\theta_r|\theta_a) = \frac{1}{\sqrt{2\pi}\sigma} e^{-\frac{(\theta_a-\theta_r)^2}{\sigma^2}},$$

until the distribution has a small standard deviation (STD). The wall orientation is computed $$\text{by } \theta_w = \sum_{\theta_a=-45}^{45} \theta_a p(\theta_a).$$

The STD is given by $$\sigma = \sqrt{\sum_{\theta_a=-45}^{45} (\theta_a - \theta_w)^2 p(\theta_a)}.$$

After wall orientation is obtained, all points to the wall coordinator can be transformed, and the width (W) and length (L) of the area bounded by the points can be computed. If 2W≤L, it is HALLWAY otherwise it is ROOM.

FIG. 15 depicts examples 1500A and 1500B of area size computation, for exemplary embodiments of the present disclosure.

As shown, local feature points can be computed at the same sampling rate as the robot process, i.e. ~20 Hz. Let: x0,y0,θ0 be the first point of the current segment, x1,y1,θ1, be the previous point, x2,y2,θ2 be the current point, dD be distance between x1,y1 and x2,y2, and dA be |θ2−θ1|, Type be current type: LINE or CORNER, D be distance and A be angle
    If dD/dA<1
        If Type is LINE, and D>0.3 m: Output feature x1, y1, θ, 1, i.e., line ends at x1, y1, θ, where θ is the direction from x0, y0, to x1, y1, and x0←x2, y0←y2, θ0←θ2, Type←CORNER
        Else A←A+θ2−θ1, Type←CORNER
    If dD/dA>1
        Type is CORNER, and A>0.5 radians: Output feature x1, y1, A, 0, i.e., corner ends at x1, y1, and x0←x2, y0←y2, θ0←θ2, Type←LINE
        Else D←D+dD, Type←LINE The following describes a Global Feature Merging algorithm for exemplary embodiments: Let Type, D, A be the current segment, where Type is LINE or CORNER, D is length and A is direction of line or angle of corner, x0, y0, θ0, s0 be last and x1,y1,θ1,s1 be the new feature point, and dD is distance bwt x0,y0 and x1,y1:
    If s1=0
        If Type is LINE: create a new current segment with Type←CORNER, D←dD, A←θ1
        If Type is CORNER: D←D+dD, A←A+θ1
    If s1=1
        If Type is LINE: D←D+dD, A←arctan(D sin(A)+(dD)sin(θ1), D cos(A)+(dD)cos(θ1))
        If Type is CORNER: create a new current segment with Type←LINE, D←dD, A←θ1

Figure 16:
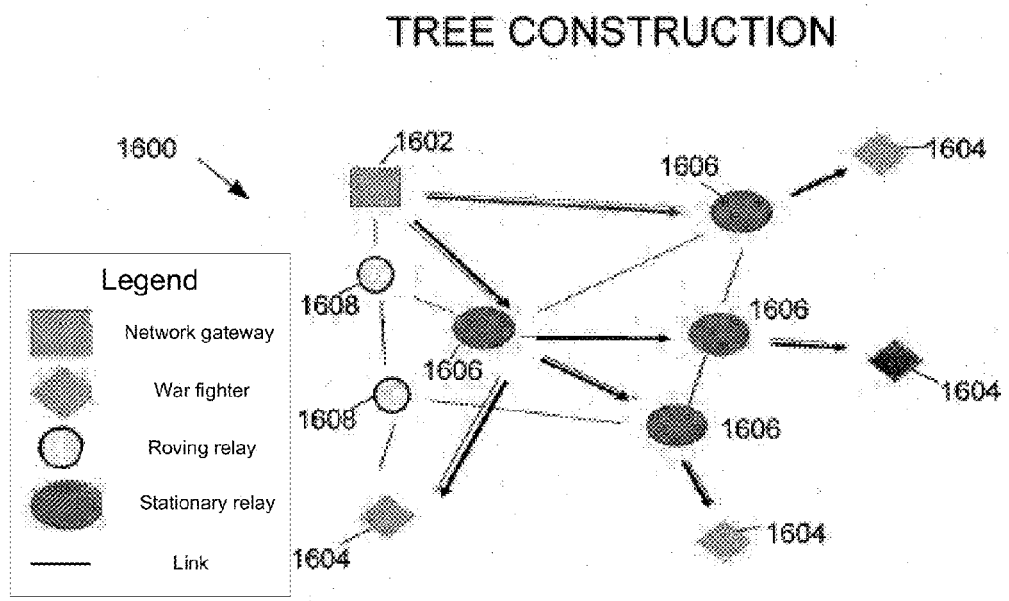
FIG. 16 shows an example of a spanning tree for a mesh network, according to an exemplary embodiment of the present disclosure.

The following described a Wall Segments and Loop Detection algorithm for exemplary embodiments: Given a sequence of segments, a wall outline can be produced as follows: For any two consecutive line segments, D0, A0, and D1, A1, if |A1−A0|<1, removing the corner in between, else, if A1−A0>0, left turn 90 degrees, else left turn 90 degrees.
Turn counting:
    Each left turn counts 1
    Each right turn counts −1
    Accumulative Turn Counting:
    Summing left and right turns, the result is AA, and T is a number >4
    If AA<−T, trapped in island
    If AA>T, explored all enclosed space For some application an optimal spanning tree computation can be utilized. For a mobile relay network, mobile nodes need to move after initial deployment to search for more user nodes in the area. However, it is important to not break the existing connections during reconfiguration. The problem is to determine, given a particular configuration, which nodes should stay in place and which nodes should move. This can be reduced to generating a backbone tree which connects all existing users. Nodes that are not in the tree can move freely to search for more users. FIG. 16 shows an example 1600 of the spanning tree, according to an exemplary embodiment.

For the tree span, the following assumptions can be made: a complete topology is available, with pair-wise connections marked by RSSI values. In actual data, A→B may not be the same as B→A. The algorithm, however, uses symmetric links: two ways to convert asymmetric links to symmetric links: use the smaller RSSI or use the average RSSI. Also, the converge-cast pattern can be assumed, i.e., all war-fighter nodes communicate to the gateway.

For exemplary tested embodiments, two spanning tree algorithms were implemented: an approximate Steiner tree algorithm that minimizes the number of nodes that connects the user to the base station, and an optimal link quality algorithm that maximizes overall link quality (the worst quality link in the tree is the best over all possible trees, where link quality is defined on RSSI values). The approximate Steiner tree algorithm yielded better performance in the experiments.

An Approximate Steiner Tree (AST) Algorithm can be described as follows: given a graph G with vertices V, edges E, and edge weights w, and a subset $S \subseteq V$, a Steiner Tree is a tree of minimal total weight that includes all vertices in S. Computation of the Steiner tree for an arbitrary graph G is a well-known NP-complete problem. In the Self-organizing mesh case, V is the set of nodes (including warfighters and robotic radio relay nodes, also known as "LANdroids," referring to local area network droids), E is the set of connections between two nodes, w is a function of $$RSSI\left(\text{cuttently } \frac{1}{\sqrt{RSSI}}\right)$$

and S is the set of war-fighter nodes. (The control software implementation can approximate edge weights for edges below the network's connectivity threshold of 20 RSSI units as having infinite edge weight.) The algorithm can be implemented as follows:

1. Compute the shortest pair-wise path distance (least total edge weight) from any node to the base-station by dynamic programming.
2. Order all nodes starting from the gateway and war-fighter nodes, $n_1, n_2, \ldots$.
3. Assign each node v a Boolean value p(v): p(v)=true if v is the parent of another node in the approximate Steiner tree, and p(v)=false for all v initially.

Let d(v,B) be the distance from v to the gateway. The parent of v is the neighbor n for which d(n,B)+pt(n) is the smallest, where pt(n)=0.1 if p(n)=false and pt(n)=0 if p(n) is true. This penalizes the use of leaf node as an interior node of the Steiner tree without affecting the shortest path criterion (the maximum observed RSSI is 100 for the Phase 1 radio, so the minimum weight of an edge is 0.1).

After obtaining a spanning tree, redundant relay nodes can be obtained as follows: removing all the leaf nodes that are not war-fighters, until nothing can be removed. All the nodes that can be removed are free nodes that can move to search for other war-fighters.

Network Control Operations related to network control are handled by WiFiAgent and LinkAgent. STPERAgent, H2OAgent, and LinkAgent can send messages to their counterparts on connected nodes. Each agent internally specifies the structure of the message it will send, when it will send it, and how it will handle the message when it receives it. Information between agents of the same type is encapsulated by the message format and the message handler specification in the agent's design and does not affect other processes running on the source or destination nodes. The WiFiListenerProcess provides message delivery services and routes received messages to the correct queue on the destination node. The messages sent by agents appear in their neighbors' queues. The LinkProcess runs the LinkAgent, which is responsible for handling the network message from the government-furnished radio as well as network messages broadcast from neighbors.

Network control embodiments can receive a network data message and handle it internally as well as broadcast it to other nodes; this is useful for constructing routing tables and RSSI graphs. When a node receives a network state message, the WiFiListenerProcess push the message to the Link queue so it can be handled in LinkProcess. The LinkAgent handles two types of messages; ones directly from the radio API and those indirectly from other nodes broadcast (note that these two types have the exact same structure and thus can be considered a single type). The LinkAgent parses these messages and updates LinkStateMgr to reflect the network state. The LinkStateMgr acts as a database to access the link state of the network. All other components have access to this class which is updated asynchronously whenever it receives a network message.

Self-organizing mesh control software according to the present disclosure can include various main capabilities: decentralized behavior selection and execution; maintenance of a distributed map of the physical and RF environment; maximization of network effectiveness; and adaptation to changes in the robots' environment. Exemplary embodiments of software architecture map the first three of these capabilities to five concurrent processes, interacting through shared data and message queues. A single-writer, multiple-reader shared data configuration can simplify coding, and well-defined interfaces ca lead to a high degree of modularity. For exemplary tested embodiments, the source code implementing these five processes follows an object-oriented design.

There may be many other ways to implement the invention. Various functions and elements described herein may be partitioned differently from those shown without departing from the spirit and scope of the invention. For example, while embodiments of the present disclosure have been described in the context of robots that are deployed terrestrially, e.g., in urban or rural theatres, other embodiments can include robots that are deployed extra-terrestrially, e.g., in orbital satellite or lunar theatres, and the like. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description

What is claimed is:

1. A self-configuring communications mesh network infrastructure comprising:
    a plurality of robotic radio relay nodes configured for self-configuration movement and radio transmission and reception as part of a mesh network;
    a robot agent configured to execute tactics and skills associated with the plurality of robotic radio relay nodes; and
    a robot control platform configured to control the plurality of robotic radio relay nodes, wherein control of the plurality of robotic radio relay nodes comprises:
    selection of a multi-robot play that includes coordinated movement of one or more robotic radio relay nodes;
    maintenance of a distributed map of a location of the plurality of robotic radio relay nodes; and
    control over a transmit power and link data rate of the plurality of robotic radio relay nodes.

2. The self-configuring communications mesh network infrastructure of claim 1, comprising a gateway configured to form a wireless link to one or more of the plurality of robotic radio relay nodes and to link to another gateway.

3. The self-configuring communications mesh network infrastructure of claim 1, wherein control of the plurality of robotic radio relay nodes comprises control of optimization of the mesh network.

4. The self-configuring communications mesh network infrastructure of claim 3, wherein optimization comprises one or more of the robotic radio relay nodes moving according to a spoker tactic.

5. The self-configuring communications mesh network infrastructure of claim 1, wherein the robot control platform is configured to receive sensor data from the plurality of robotic radio relay nodes.

6. The self-configuring communications mesh network infrastructure of claim 1, wherein the robot control platform comprises a link state manager configured to store data regarding link states of the plurality of robotic radio relay nodes.

7. The self-configuring communications mesh network infrastructure of claim 6, wherein the link state manager comprises a database.

8. The self-configuring communications mesh network infrastructure of claim 1, wherein the robot control platform comprises a hierarchical, hypothetical, and opportunistic (H2O) state manager configured to store data regarding hierarchical, hypothetical, and opportunistic (H2O) states of the plurality of robotic radio relay nodes.

9. The self-configuring communications mesh network infrastructure of claim 8, wherein the a H2O state manager comprises a database.

10. The self-configuring communications mesh network infrastructure of claim 1, wherein the robot control platform comprises a robot state manager configured to store data regarding physical environment of each of the plurality of robotic radio relay nodes.

11. The self-configuring communications mesh network infrastructure of claim 10, wherein the robot state manager comprises a database.

12. The self-configuring communications mesh network infrastructure of claim 1, wherein the robotic control platform comprises a skills, tactics and plays for exploration and relay (STPERS) state manager configured to store data regarding multi-robot behavior of the plurality of robotic radio relay nodes.

13. The self-configuring communications mesh network infrastructure of claim 12, wherein the skills, tactics and plays for exploration and relay (STPERS) state manager comprises a database.

14. The self-configuring communications mesh network infrastructure of claim 1, wherein the plurality of robotic radio relay nodes are configured to operate as state machines.

15. The self-configuring communications mesh network infrastructure of claim 1, comprising a STPER agent configured to choose a tactic to execute and to command the robot agent to load the tactic.

16. A method of controlling a self-configuring communications mesh network infrastructure including (i) a plurality of robotic radio relay nodes configured for self-configuration movement and radio transmission and reception as part of the mesh network, and (ii) a robot control platform configured to control the plurality of robotic radio relay nodes, the method comprising:
    selecting a multi-robot play that includes coordinated movement of two or more robotic radio relay nodes of the plurality of robotic radio relay nodes of the mesh network;
    maintaining a distributed map of a location of the plurality of robotic radio relay nodes;
    controlling a transmit power and link data rate of the plurality of robotic radio relay nodes;
    causing execution of tactics and skills associated with the plurality of robotic radio relay nodes; and
    causing selection of a tactic to execute and to command loading of the tactic.

17. The method of claim 16, wherein maintaining a distributed map of a location of the plurality of robotic radio relay nodes comprises maintaining information about radio frequency (RF) environment at the respective locations of the plurality of robotic radio relay nodes.

18. The method of claim 16, comprising using a gateway to form a communications link to one or more of the plurality of robotic radio relay nodes, wherein the gateway is configured to form a wireless link to one or more of the plurality of robotic radio relay nodes and to link to another gateway.

19. The method of claim 16, comprising controlling optimization of the mesh network.

20. The method of claim 19, wherein optimization comprises one or more of the robotic radio relay nodes moving according to a spoker tactic.

21. The method of claim 19, wherein optimization comprises computing an optimal spanning tree for movement of one or more of the plurality of robotic radio relay nodes.

22. The method of claim 16, wherein the robot control platform is configured to receive sensor data from the plurality of robotic radio relay nodes.

23. The method of claim 16, wherein the robotic control platform comprises a link state manager configured to store data regarding link states of the plurality of robotic radio relay nodes.

24. The method of claim 16, wherein the robotic control platform comprises a hierarchical, hypothetical, and opportunistic (H2O) state manager configured to store data regarding hierarchical, hypothetical, and opportunistic (H2O) states of the plurality of robotic radio relay nodes.

25. The method of claim 16, wherein the robotic control platform comprises a robot state manager configured to store data regarding physical environment of each of the plurality of robotic radio relay nodes.

26. The method of claim 16, wherein the robotic control platform comprises a skills, tactics and plays for exploration and relay (STPERS) state manager configured to store data regarding multi-robot behavior of the plurality of robotic radio relay nodes.

27. The method of claim 16, wherein the plurality of robotic radio relay nodes are configured to operate as state machines.

28. The method of claim 16, wherein causing execution of tactics and skills comprises causing a robot agent to execute the tactics and skills associated with the plurality of robotic radio relay nodes.

29. The method of claim 28, wherein causing selection of the tactic comprises causing a STPER agent to choose a tactic to execute and to command the robot agent to load the tactic.

30. The method of claim 16, comprising implementing a hierarchical, hypothetical, and opportunistic (H2O) algorithm for one or more of the plurality of robotic radio relay nodes.

31. The method of claim 30, wherein the H2O algorithm comprises position estimation.

32. The method of claim 30, wherein the H2O algorithm comprises area type and size computation.

33. The method of claim 30, wherein the H2O algorithm comprises local feature extraction.

34. The method of claim 30, wherein the H2O algorithm comprises wall segments and loop detection.

35. The method of claim 30, wherein the H2O algorithm comprises optimal spanning tree computation.

36. The method of claim 35, wherein optimal spanning tree computation comprises an approximate Steiner Tree (AST) algorithm.

37. The method of claim 16, wherein selecting a multi-robot play comprises selecting an initialization play.

38. The method of claim 16, wherein selecting a multi-robot play comprises selecting an opportunistic connectivity edge detection (OCED) play.

39. A non-transitory machine-readable medium with machine-readable instructions for controlling a self-configuring communications mesh network infrastructure including (i) a plurality of robotic radio relay nodes configured for self-configuration movement and radio transmission and reception as part of the mesh network, and (ii) a robot control platform configured to control the plurality of robotic radio relay nodes, the machine-readable instructions executable to:
select a multi-robot play that includes coordinated movement of two or more robotic radio relay nodes of the plurality of robotic radio relay nodes of the mesh network, the multi-robot play comprising an opportunistic connectivity edge detection (OCED) play;
maintain a distributed map of a location of the plurality of robotic radio relay nodes; and
control a transmit power and link data rate of the plurality of robotic radio relay nodes.

40. The non-transitory machine-readable medium of claim 39, wherein the machine-readable instructions executable to maintain a distributed map of the location of the plurality of robotic radio relay nodes comprises machine-readable instructions executable to maintain information about radio frequency (RF) environment at the respective locations of the plurality of robotic radio relay nodes.

41. The non-transitory machine-readable medium of claim 39, wherein the machine-readable instructions are executable to use a gateway to form a communications link to one or more of the plurality of robotic radio relay nodes, wherein the gateway is configured to form a wireless link to one or more of the plurality of robotic radio relay nodes and to link to another gateway.

42. The non-transitory machine-readable medium of claim 39, wherein the machine-readable instructions are executable to optimize the mesh network.

43. The non-transitory machine-readable medium of claim 42, wherein the machine-readable instructions are executable to cause one or more of the robotic radio relay nodes to move according to a spoker tactic.

44. The non-transitory machine-readable medium of claim 42, wherein the machine-readable instructions executable to optimize the mesh network comprises machine-readable instructions executable to compute an optimal spanning tree for movement of one or more of the plurality of robotic radio relay nodes.

45. The non-transitory machine-readable medium of claim 39, wherein the machine-readable instructions are executable to cause a robot agent to execute tactics and skills associated with the plurality of robotic radio relay nodes.

46. The non-transitory machine-readable medium of claim 45, wherein the machine-readable instructions are executable to cause a STPER agent to choose a tactic to execute and to command the robot agent to load the tactic.

47. The non-transitory machine-readable medium of claim 39, wherein the machine-readable instructions are executable to implement a hierarchical, hypothetical, and opportunistic (H2O) algorithm for one or more of the plurality of robotic radio relay nodes.

48. The non-transitory machine-readable medium of claim 47, wherein the H2O algorithm comprises position estimation.

49. The non-transitory machine-readable medium of claim 47, wherein the H2O algorithm comprises area type and size computation.

50. The non-transitory machine-readable medium of claim 47, wherein the H2O algorithm comprises local feature extraction.

51. The non-transitory machine-readable medium of claim 47, wherein the H2O algorithm comprises wall segments and loop detection.

52. The non-transitory machine-readable medium of claim 47, wherein the H2O algorithm comprises optimal spanning tree computation.

53. The non-transitory machine-readable medium of claim 52, wherein optimal spanning tree computation comprises an approximate Steiner Tree (AST) algorithm.

54. A robot configured for operation within a self-configuring communications mesh network, the robot comprising:
a radio frequency (RF) system configured as a network node to receive and transmit RF communications from a network;
a sensor system configured to sense physical conditions of the environment of the robot;
a locomotion system configured to move the robot in a desired direction; and
a control system configured to receive signal from the sensor system and to control the RF system and the locomotion system according to an opportunistic connectivity edge detection (OCED) algorithm, wherein the robot is configured to explore a deployment region and to connect to a self-configuring communications mesh network.

55. The network robot of claim 54, wherein the OCED algorithm comprises connecting to another network node according to a FIND_CLUSTERS state.

56. The robot of claim 54, wherein the OCED algorithm comprises a SR_SEARCH state, wherein the robot is configured to have a connection to at least one stationary relay (SR) in the mesh network, and wherein the robot is configured to move until the robot loses all connectivity to the at least one stationary relay (SR) and continuously measure received signal strength indication (RSSI) to find boundaries of the connectivity region for each stationary relay (SR).

57. The robot of claim 54, wherein the OCED algorithm comprises a TRANSFER_WALL state, wherein the robot is configured to move in a direction until it bumps into an object, and wherein the robot is configured to then change course.

58. The robot of claim 54, wherein the sensor system comprises a bump sensor.

59. The robot of claim 58, wherein the bump sensor comprises an accelerometer.

60. The robot of claim 54, wherein the OCED algorithm comprises a REGAIN_SR state, wherein the robot is configured to backtrack a previous course to regain a connection to a stationary relay (SR).

61. The robot of claim 54, wherein the OCED algorithm comprises a SR_CHECKS state, wherein the robot is configured to check link quality, failed nodes, and connectivity.

62. The robot of claim 61, wherein the robot is configured to monitor received signal strength indication (RSSI) to each of its next hop neighbors that are stationary relays (SRs).

\* \* \* \* \*